(12) United States Patent
Kenthapadi et al.

(10) Patent No.: US 10,255,282 B2
(45) Date of Patent: Apr. 9, 2019

(54) DETERMINING KEY CONCEPTS IN DOCUMENTS BASED ON A UNIVERSAL CONCEPT GRAPH

(71) Applicant: Microsoft Technology Licensing, LLC, Redmond, WA (US)

(72) Inventors: Krishnaram Kenthapadi, Sunnyvale, CA (US); Fedor Vladimirovich Borisyuk, Sunnyvale, CA (US); Parul Jain, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 364 days.

(21) Appl. No.: 15/061,296

(22) Filed: Mar. 4, 2016

(65) Prior Publication Data

US 2017/0255621 A1 Sep. 7, 2017

(51) Int. Cl.
*G06F 17/30* (2006.01)
*H04L 29/08* (2006.01)

(52) U.S. Cl.
CPC .... *G06F 17/30011* (2013.01); *G06F 17/3053* (2013.01); *G06F 17/30867* (2013.01); *G06F 17/30893* (2013.01); *G06F 17/30958* (2013.01); *H04L 67/10* (2013.01)

(58) Field of Classification Search
CPC ........... G06F 17/30011; G06F 17/3053; G06F 17/30867; G06F 17/30958; G06F 17/30893; H04L 67/10
See application file for complete search history.

(56) References Cited

U.S. PATENT DOCUMENTS

| | | | |
|---|---|---|---|
| 8,244,848 B1 | 8/2012 | Narayanan et al. | |
| 9,154,847 B2 | 10/2015 | Rothschild et al. | |
| 9,158,847 B1 | 10/2015 | Majumdar | |
| 2011/0004692 A1 | 1/2011 | Occhino et al. | |

(Continued)

FOREIGN PATENT DOCUMENTS

WO 2017151899 9/2017

OTHER PUBLICATIONS

Agrawal, Similarity Search using Concept Graphs, pp. 719-728 (Year: 2014).*
"International Application Serial No. PCT/US2017/020420, International Search Report dated May 11, 2017", 2 pgs.
"International Application Serial No. PCT/US2017/020420, Written Opinion dated May 11, 2017", 13 pgs.

(Continued)

*Primary Examiner* — Albert M Phillips, III
(74) *Attorney, Agent, or Firm* — Schwegman Lundberg & Woessner, P.A.

(57) ABSTRACT

A machine may be configured to determining key concepts in documents. For example, the machine accesses a universal concept graph that includes a first set of nodes that represent concept phrases derived from internal documents associated with a social networking service (SNS) and external documents that are external to the SNS, and a first set of edges that connect a plurality of nodes of the first set of nodes. The machine accesses a content object associated with the SNS. The machine generates an induced concept graph associated with the content object based on an analysis of the content object and the universal concept graph. The machine identifies one or more key concept phrases in the content object based on applying one or more key concept selection algorithms to the induced concept graph. The machine stores the one or more key concept phrases in a record of a database.

20 Claims, 13 Drawing Sheets

(56) References Cited

U.S. PATENT DOCUMENTS

| | | | |
|---|---|---|---|
| 2012/0221581 A1 | 8/2012 | Narayanan et al. | |
| 2012/0330869 A1 | 12/2012 | Durham | |
| 2013/0095864 A1 | 4/2013 | Marovets | |
| 2013/0254213 A1 | 9/2013 | Cheng et al. | |
| 2014/0214943 A1 | 7/2014 | Shapero et al. | |
| 2014/0330819 A1 | 11/2014 | Raina et al. | |
| 2014/0330869 A1 | 11/2014 | Factor et al. | |
| 2015/0254371 A1 | 9/2015 | Zhang et al. | |
| 2015/0379113 A1 | 12/2015 | Wang et al. | |
| 2016/0012119 A1* | 1/2016 | Franceschini | G06F 17/30864 707/722 |
| 2016/0224547 A1* | 8/2016 | Agrawal | G06F 17/30011 |
| 2017/0242909 A1 | 8/2017 | Kenthapadi et al. | |

OTHER PUBLICATIONS

"U.S. Appl. No. 15/052,359, Non Final Office Action dated Jan. 29, 2018", 19 pgs.

"Amendment & Response to Non Final Office Action Issued in U.S. Appl. No. 15/052,359", filed Jun. 29, 2018, 19 Pages.

"Applicant Initiated Interview Summary in U.S. Appl. No. 15/052,359", dated Jul. 10, 2018, 3 Pages.

"Notice of Allowance Issued in U.S. Appl. No. 15/052,359.", dated Sep. 26, 2018, 18 Pages.

"International Preliminary Report on Patentability Issued in PCT Patent Application No. PCT/US17/020420", dated Sep. 13, 2018, 15 Pages.

"Non Final Office Action Issued in U.S. Appl. No. 15/052,359", dated Nov. 15, 2018, 15 Pages.

\* cited by examiner

DETERMINING KEY CONCEPTS IN DOCUMENTS BASED ON A UNIVERSAL CONCEPT GRAPH

TECHNICAL FIELD

The present application relates generally to the processing of data, and, in various example embodiments, to systems, methods, and computer program products for determining key concepts in documents based on a universal concept graph associated with a social networking service.

BACKGROUND

Many social networking services, such as Facebook or the professional social networking service LinkedIn®, make recommendations to their users. These recommendations may pertain to people with whom to connect, articles to read, jobs for which to apply, etc. The quality and relevance of such recommendations may be heavily dependent on the underlying representation of various content items used to generate such recommendations. Examples of content items or objects are a member profile, a job posting, a SlideShare article, a Pulse article, etc.

Today, the quality of many recommendations suffers from the problem of vocabulary mismatch between different content types. For example, if a member profile of a member of a social networking service (also referred to herein as "SNS") and a job description use different terminologies to refer to the same underlying concept, the SNS may fail to match the member profile to the job description, and to recommend the respective job to the member.

To address this problem, it may be beneficial to an SNS to generate a universal concept graph that includes a unified and standardized set of concept phrases that may be used to generate better recommendations to the members of the SNS.

BRIEF DESCRIPTION OF THE DRAWINGS

Some embodiments are illustrated by way of example and not limitation in the figures of the accompanying drawings, in which.

DETAILED DESCRIPTION

Figure 1:
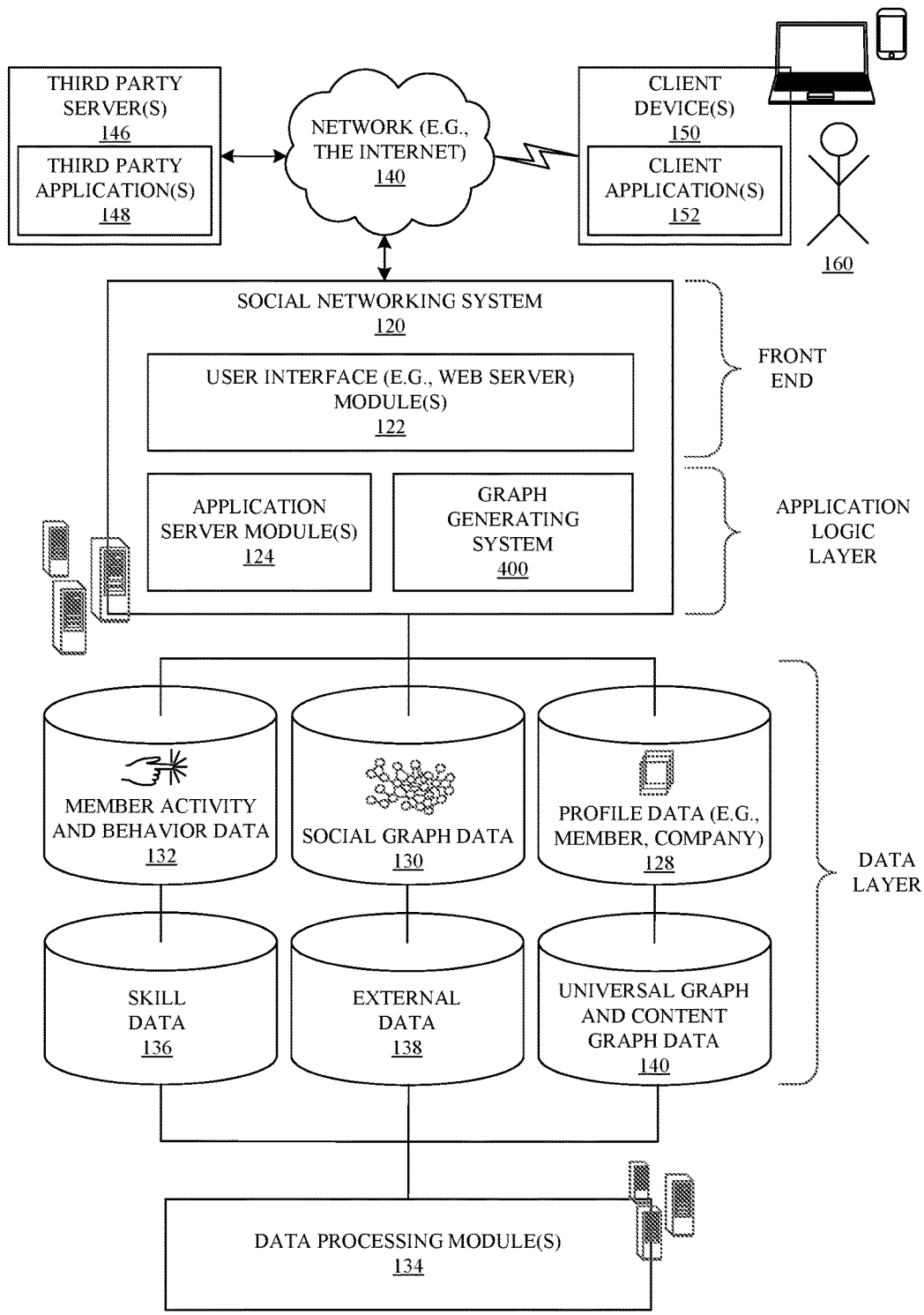
FIG. 1 is a network diagram illustrating a client-server system, according to some example embodiments.

Example methods and systems for determining key concepts in documents based on a universal concept graph associated with a universal concept graph are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Often social networking services, such as Facebook or the professional social networking service LinkedIn®, make recommendations to their users. Examples of recommendations made by a SNS to a member of the SNS are a recommendation to connect to another member of the SNS, a recommendation to read a particular article, a recommendation of a job made to a particular member of the SNS, or a recommendation of a particular member of the SNS made to a recruiter for a particular job. Whether such a recommendation is acted upon by the recommendee often depends on whether the content associated with the recommendation is relevant to the recommendee. Generally, a particular content is relevant to a recommendee if the recommending system performs a highly accurate match between the data pertaining to the recommendee (e.g., a member profile of a recommendee, a set of skills of the recommendee, a set of preferences of the recommendee, etc.) and the content of the content item being recommended to the recommendee. Examples of content items are a member profile, a job posting, a SlideShare article, a Pulse article, etc.

Today, the quality of many recommendations suffers from the problem of vocabulary mismatch between different content types. In some instances, because a member profile of a member of a social networking service (also referred to herein as "SNS") and a job description are written by different people, the member profile and the job description most likely use different terminologies to refer to the same underlying concept. Therefore, the SNS may fail to match the member profile to the job description, and to recommend the respective job to the member. For example, if the member profile uses the term "dentistry," and the job description uses the term "dentist," the SNS may fail to determine that the member profile is a match for the job description, and therefore may fail to recommend the respective job to the member.

Similarly, in certain instances, if the member profile and the job description use synonyms to refer to the same underlying concept, the SNS may fail to match the member profile to the job description, and to recommend the respective job to the member. For example, if the member profile uses the term "Patent Attorney," and the job description uses the term "Patent Lawyer," the SNS may fail to determine that the member profile is a match for the job description, and therefore may fail to recommend the respective job to the member.

To address this problem, it may be beneficial to an SNS to generate a universal concept graph that includes a unified and standardized set of concept phrases that may be used to generate better recommendations to the members of the SNS. A graph generating system may construct the universal concept graph based on combining internal concept phrases extracted from internal data assets (e.g., a set of member profiles, a set of skills, a set of occupation titles, a set of educational course names, etc.) of the SNS with external concept phrase extracted from external datasets, such as Wikipedia or Freebase. In some instances, external datasets, such as Wikipedia or Freebase, include a linkage structure among the documents (e.g., articles) published by these sites. The linkage structure (e.g., hyperlinks in a first document point to one or more other documents) may facilitate a better understanding of the relationships among the concepts linked by the linkage structure. The graph generating system may leverage the linkage structure of the external datasets to complement the knowledge about concept phrases and the knowledge about the relationships among concept phrases provided by the internal assets of the SNS in building the universal graph.

The universal concept graph may be leveraged for determining a set of key concepts in a given content object, by mining not just the information present in the content object, but also data from external sources that have been included in the universal concept graph.

The graph generating system may also use the universal concept graph to determine member-job and job-member similarity score values that may facilitate the generation of more accurate job recommendations and talent match identifications.

In some example embodiments, the graph generating system generates, at a particular time, an internal set of concept phrases based on an internal dataset that includes content from one or more internal documents associated with an SNS. The graph generating system also generates, at the particular time, an external set of concept phrases based on an external dataset that includes content from one or more external documents that are external to the SNS. The graph generating system generates a set of nodes for a universal concept graph (also referred to herein as "UCG") based on performing a union operation of the internal set of concept phrases and the external set of concept phrases, each node corresponding to a particular concept phrase. The graph generating system generates a set of edges among a plurality of nodes of the set of nodes based on one or more relationship indicators for pairs of nodes of the set of nodes. The graph generating system generates the universal concept graph based on the set of nodes and the set of edges among the plurality of nodes.

The graph generating system may periodically update the universal concept graph to add new nodes and edges for new concept phrases and relationships among the nodes of the universal concept graph. The updating of the universal concept graph may be based on new external article titles and content of articles, as well as new internal documents. For example, Wikipedia provides a data dump of all the Wikipedia pages as one structured dataset. The graph generating system may access a previous data dump that was used for generating a previous version of the universal concept graph (e.g., from a database), and the current data dump from Wikipedia. The graph generating system may compare the previous data dump and the current data dump, and may determine what has changed (e.g., what concepts and relationships between concepts are new, what concepts or relationships should be removed, etc.) in the current data dump. The graph generating system may add or remove nodes, edges, or both based on the comparison of the previous data dump and the current data dump, and the determination of what has changed in the current data dump.

According to various example embodiments, the graph generating system generates a universal concept graph based on internal assets (e.g., a set of skills, a set of job titles, a set of locations, a set of names of companies, a set of names of universities, a set of job descriptions, a set of news articles, and associated content and linkages) of the SNS, and external structured datasets (e.g., data provided by Wikipedia or Freebase). The universal concept graph may evolve with time, as the underlying information changes over time.

Accordingly, the graph generating system may use as input (1) a time t, (2) internal assets (e.g., documents, records, datasets, etc.) of the SNS, and (3) one or more external structured datasets to generate an output: a universal concept graph, $H_{UCG}=(V_{UCG}, E_{UCG}, w)$ at time t, where UCG is the universal concept graph, $V_{UCG}$ is a set of nodes of the universal concept graph, $E_{UCG}$ is a set of edges of the universal concept graph, and w is a weight of an edge. The weight of the edge between two nodes may indicate the degree of relatedness of the two concept phrases represented by the two nodes. In some instances, the weight of the edge takes a value between "0.00" and "1.00." In some example embodiments, the universal concept graph is represented as $H_{UCG}=(V_{UCG}, E_{UCG})$ when no weights are assigned to the edges of the universal concept graph.

In certain example embodiments, the graph generating system determines the set of nodes $V_{UCG}$ for the universal concept graph by taking the union of the set of concept phrases obtained (e.g., extracted, identified, determined, etc.) from internal sources $V_{int}$ and the set of concept phrases obtained from the external dataset $V_{ext}$: $V_{UCG}=V_{int} \cup V_{ext}$.

$V_{ext}$ denotes the set of external concept phrases obtained from the external structured dataset at time t. In certain example embodiments, $V_{ext}$ corresponds to the set of titles of articles in Wikipedia.

$V_{int}$ denotes the set of internal concept phrases obtained from the internal assets at time t. This set can correspond to one or more (e.g., all) names of skills, occupation titles, educational course names, locations, names of companies, names of universities, etc. identified from the internal data sources of the SNS. These internal concept phrases may be mapped to the external dataset (e.g., external concept phrases from the external dataset) to obtain canonical versions of the internal concept phrases. The determining of the canonical versions of the internal concept phrases may facilitate the avoidance of duplication of concept phrases when taking the union of the set of internal concept phrases and the set of external concept phrases.

For example, the internal dataset uses the concept phrase "Software Developer," while the external dataset (e.g., Wikipedia) uses the concept phrase "Software Engineer." To obtain the canonical version of every phrase, the graph generating system may use the redirection mechanism associated with the external dataset. For instance, the graph generating system issues a query to a device storing the external dataset. The query includes the term "Software Developer." In response to the query from the graph generating system, the device storing the external dataset automatically redirects the query to the page corresponding to the canonical version (e.g., Software Engineer) of the term included in the query. There could be a chain of redirects. Following the chain of redirects and mapping every term in the internal dataset to the corresponding canonical version of the term is one way to standardize (e.g., unify, consolidate, etc.) the used terminology to a single vocabulary for the purpose of building the universal concept graph.

The graph generating system determines the set of relationship edges $E_{UCG}$, and the edge weight function w, by taking into account the hyperlink structure and the content similarity in the internal and external datasets.

According to various example embodiments, $V_{UCG}$ is defined only in terms of either $V_{ext}$ or $V_{int}$, instead of taking the union of $V_{ext}$ and $V_{int}$.

Consistent with some example embodiments, the edges of the universal graph do not have weights associated with them and, accordingly, the universal concept graph is an unweighted graph. In some example embodiments, where u and v represent a first and second nodes of the universal concept graph (e.g., the first and second nodes corresponding to a first and second concept phrases, respectively), the graph generating system determines that an edge (u,v) connects the first node u and the second node v of the universal concept graph if (e.g., if and only if) there is a hyperlink from the article page corresponding to u in the external dataset to the article page corresponding to v in the external dataset. In some example embodiments, the edge (u,v) is included in the universal concept graph if (e.g., if and only if) the hyperlink is present in both directions (e.g., u hyperlinks to v, and v hyperlinks to u).

In some example embodiments, the graph generating system determines that an edge (u,v) connects the first node u and the second node v of the universal concept graph if (e.g., if and only if) there is a hyperlink (e.g., a reference) from the web page corresponding to u in the SNS to the web page corresponding to v in the SNS. In some example embodiments, the edge (u,v) is included in the universal concept graph if (e.g., if and only if) the hyperlink (e.g., the reference) is present in both directions (e.g., u hyperlinks to v, and v hyperlinks to u).

In some example embodiments, the graph generating system determines that an edge (u,v) connects the first node u and the second node v of the universal concept graph if (e.g., if and only if) a weighted Jaccard similarity value between the content of the documents corresponding to the two nodes u and v (e.g., article pages in the external dataset, a member profile and a job description, etc.) exceeds a threshold value. In some instances, a document (e.g., an article) associated with a concept phrase is represented in terms of the underlying terms, along with their frequency counts. For example, if the content of a document is "software spark scala software," then the document is represented as {(software, 2), (spark, 1), (scala, 1)}.

In some example embodiments, the graph generating system determines that an edge (u,v) connects the first node u and the second node v of the universal concept graph if (e.g., if and only if) the concept phrase corresponding to the first node u and the concept phrase corresponding to the second node v co-occur significantly within the internal dataset of the SNS, within the external dataset, or within both. Significant co-occurrence can be defined as both concept phrases occurring together within a unit of text (e.g., a paragraph, a particular number of sentences, a set of words, etc.) at least a particular number of times in a dataset or a combination of datasets.

In various example embodiments, the universal concept graph is a weighted graph. In a weighted graph, the edges among the nodes of the graph have weights associated with them. According to various example embodiments, the set of edges $E_{UCG}$ includes only edges associated with non-zero (e.g., positive) weights. In some example embodiments, where u and v represent a first and second nodes of the universal concept graph (e.g., the first and second nodes corresponding to a first and second concept phrases, respectively), the graph generating system determines that an edge (u,v) connects the first node u and the second node v of the universal concept graph if (e.g., if and only if) there is hyperlink from the article page corresponding to u in the external dataset to the article page corresponding to v in the external dataset. The edge weight is either 0 or 1, depending on whether the edge exists. In some example embodiments, the edge (u,v) is included in the universal concept graph if (e.g., if and only if) the hyperlink is present in both directions (e.g., u hyperlinks to v, and v hyperlinks to u).

In some example embodiments, the graph generating system determines that an edge (u,v) connects the first node u and the second node v of the universal concept graph if (e.g., if and only if) there is a hyperlink (e.g., a reference) from the web page corresponding to u in the SNS to the web page corresponding to v in the SNS. The edge weight is either 0 or 1, depending on whether the edge exists. In some example embodiments, the edge (u,v) is included in the universal concept graph if (e.g., if and only if) the hyperlink (e.g., the reference) is present in both directions (e.g., u hyperlinks to v, and v hyperlinks to u).

In some example embodiments, the graph generating system determines that the weight of an edge (u,v) between two nodes u and v equals the weighted Jaccard similarity value between the content of the documents corresponding to the two nodes u and v (e.g., article pages in the external dataset, a member profile and a job description, etc.). In some instances, a document (e.g., an article) associated with a concept phrase is represented in terms of the underlying terms, along with their frequency counts. For example, if the content of a document is "software spark scala software," then the document is represented as {(software, 2), (spark, 1), (scala, 1)}.

In some example embodiments, the graph generating system determines that the weight of an edge (u,v) between two nodes u and v equals the number of co-occurrences of the concept phrases corresponding to the nodes u and v within the internal dataset of the SNS, within the external dataset, or within both, divided by a normalizing factor. Co-occurrence can be defined as both concept phrases occurring together within a unit of text (e.g., a paragraph, a particular number of sentences, a set of words, a document, etc.) in an internal or external dataset, or in a combination of datasets.

In some example embodiments, the graph generating system determines a weighted combination of the above-described weight functions based on a machine-learning model that uses linear regression or logistic regression techniques. The model is "taught" (e.g., trained) with respect to a ground truth dataset, wherein each item in the ground truth dataset corresponds to a pair of sample concepts (u,v) that are related. For each pair (u,v), the graph generating system computes one or more weight values (e.g., intermediate weight values) using different weight functions. The graph generating system also receives a ground truth weight value that could be provided by a judge. The judge may be a person whose role is to perform an analysis of the relationship between concepts u and v of the pair of concepts (u,v), and to determine a ground truth weight value that reflects the degree of relatedness of concepts u and v. Based on the ground truth weight value provided by the judge (e.g., via a user interface of a client device associated with the judge), the graph generating system associates the ground truth weight with the pair of concepts (u,v) as the current weight value of the edge between the nodes that represent concepts u and v in the universal concept graph. Based on the ground truth weight values provided for all the items in the ground truth dataset, the graph generating system uses the machine-learning model to determine the logic behind the allocation, by the human judge, of certain ground truth weight values to the sample concept pairs ground truth dataset, and to determine, using the logic, what the current edge weight values associated with the remainder of the edges in the universal concept graph should be considering all the intermediate weight values computed for a respective edge.

According to various example embodiments, the set of nodes $V_{UCG}$ is defined as the union of the set of all skills, occupation titles, educational course names, locations, company names, and university names identified based on the internal dataset of the SNS. The set of edges $E_{UCG}$ is defined based on the hyperlink structure of an external dataset (e.g., Wikipedia). For example, the graph generating system determines that an edge (u,v) exists between a first node u and a second node v of the universal concept graph if (e.g., if and only if) there is a hyperlink in the external dataset (e.g., Wikipedia) from the article page corresponding to the first node u in the external dataset to the article page corresponding to the second node v in the external dataset.

Consistent with some example embodiments, the graph generating system stores the universal concept graph in memory of a single machine, or distributed in memory across a number of machines. The universal concept graph should be easily queried by a number of applications that utilize the universal concept graph for computing subgraphs, making job recommendations, identifying candidates for jobs, etc.

For efficient retrieval of edges and computation of subgraphs, the graph generating system may create the following indices:

1. <source_node>→List of (destination_node, weight) tuples, ordered by decreasing weight; Corresponds to the list of nodes that are adjacent to a given node.
2. <source_node, destination_node>→weight; Corresponds to the list of valid edges, along with weights.

According to some example embodiments, the graph generating system accesses a universal concept graph that includes a first set of nodes that represent concept phrases derived from one or more internal documents associated with the SNS and one or more external documents that are external to the SNS, and a first set of edges that connect a plurality of nodes of the first set of nodes. The graph generating system accesses a content object associated with the SNS. The graph generating system generates an induced concept graph associated with the content object based on an analysis of the content object and the universal concept graph. The induced graph includes a second set of nodes that represent one or more concept phrases derived from the content object and a second set of edges that connect a plurality of nodes of the second set of nodes. The graph generating system identifies one or more key concept phrases in the content object based on applying one or more key concept selection algorithms to the induced concept graph. The graph generating system stores the one or more key concept phrases in a record of a database. The record may reference (e.g., be associated with) the content object.

One of the benefits of determining key concept phrases in a document may be notifying a reader of a document of the most important concepts in a document. For example, when someone views a document (e.g., a job posting), the graph generating system can identify and highlight the key concept phrases in the document. If the document is very long, a user can quickly get an idea what the key concepts are in the document if they are highlighted. Highlighting a number of most important skills (e.g., the top five key concepts) in a job description helps a member to quickly identify whether the job description is applicable to him.

According to another example, a recruiter drafts a job description. The graph generating system may determine the key concepts in the job description in real time and may highlight them. The recruiter can modify the terminology of the job description, if needed.

In some example embodiments, the graph generating system displays the key concepts in a document in a user interface of a device associated with a user (e.g., a member of the SNS) and provides a visual presentation of how the key concepts in the document are related. For example, if the key concepts in a document are skills, the member of the SNS may determine, based on the presentation of the relationships among the key concepts, that he may want to acquire one or more skills.

In some example embodiments, the set of key concept phrases for a content object are determined based on applying one or more key concept selection algorithms to the induced concept graph.

In certain example embodiments, a first key concept selection algorithm provides that the graph generating system iteratively removes leaf nodes (e.g., first degree nodes) from the induced concept graph associated with the content object until a desired number of key concept phrases are left. The degree of a node is equal to the number of other nodes to which it is connected. The desired number of key concept phrases left comprise the set of key concept phrases associated with the content object. The induced concept graph may be a weighted graph (e.g., each edge of the induced concept graph is associated with an edge weight value).

In various example embodiments, a second key concept selection algorithm provides that, for each node in an induced weighted concept graph, the graph generating system aggregates the edge weight values of all the edges that connect the particular node to other nodes. The aggregating results in a total weight value for the particular node. The graph generating system associates the total weight value with the particular node.

The graph generating system may then rank the nodes of the induced concept graph based on their total weight values in a decreasing order. The graph generating system may select a top k nodes from the list of ranked nodes, wherein k is the desired number of key concept values in the content object.

In certain example embodiments, a third key concept selection algorithm provides that the graph generating system performs a random walk (e.g.,) computation of the induced weighted concept graph. The graph generating system starts the random walk from any node in the induced concept graph. In each step, the graph generating system randomly "walks" to a neighbor node with a likelihood of going to a particular node proportional to the edge weight value of the edge to the particular node. Once the random walk is performed for a large number of steps (e.g., one thousand steps), the graph generating system determines how many times each node was visited. The graph generating system may divide, for each node, the number of visits to that node by the total number of steps (e.g., one thousand steps) to obtain the stationary distribution value associated with each node. In some instances, the higher stationary distribution value associated with a particular node, the more important the concept phrase represented by the particular node.

The graph generating system may rank the nodes in the induced concept graph based on their stationary distribution values in a decreasing order. The graph generating system may select a top k nodes from the list of ranked nodes, wherein k is the desired number of key concept values in the content object.

In certain example embodiments, a fourth key concept selection algorithm provides that the graph generating system, for every node in the induced concept graph, calculates the average number of steps to randomly walk from that node to a different node in the induced concept graph via various paths. The induced concept graph may be a weighted graph (e.g., each edge of the induced concept graph is associated with an edge weight value). For each node, the graph generating system aggregates all the average step values to walk to all the other nodes in the induced concept graph, which results in a combined commute value associated with the particular node.

Similarly, the graph generating system computes the average number of steps to reach other nodes from each of the other nodes of the induced concept graph, and generates a combined commute value for each of the other nodes of the induced concept graph. The graph generating system ranks the nodes in the induced concept graph based on their combined commute values. In some example embodiments, the graph generating system selects the node with the lowest combined commute value as the most important node representing the most important concept in the content object. In various example embodiments, the graph generating system select k nodes with the lowest combined commute values as the key concepts in the content object represented by the induced concept graph.

An example method and system for determining key concepts in documents based on a universal concept graph associated with a social networking service may be implemented in the context of the client-server system illustrated in FIG. 1. As illustrated in FIG. 1, a graph generating system 400 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

In some example embodiments, members may receive recommendations targeted to them based on various factors (e.g., member profile data, social graph data, member activity or behavior data, etc.). According to certain example embodiments, one or more members may receive career-related communications targeted to the one or more members based on various factors (e.g., member profile data, social graph data, member activity or behavior data, etc.). The recommendations or career-related communications may be associated with (e.g., included in) various types of media, such as InMail, Display Ads, Sponsored Updates, etc. Based on the interactions by the one or more members with the media or the content of the media, the interest of the one or more members in the advertising or career-related communications may be ascertained.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

According to some example embodiments, the graph generating system 400 generates a universal concept graph based on an internal set of concept phrases extracted from an internal dataset and an external set of concept phrases extracted from an external dataset. The internal dataset may include content from one or more internal documents associated with the SNS, and the external dataset may include content from one or more external documents that are external to the SNS. The internal set of concept phrases may include data stored in profile database 128, skill database 136, or any other internal database of the SNS. In some example embodiments, the external dataset includes articles published on Wikipedia or Freebase, and is represented by external database 138. In some example embodiments, the external dataset is a collection (e.g., repository, dictionary, etc.) of terms that may be used as a reference of canonical versions of concept phrases. The collection of terms may be stored as external data in database 138. The graph generating system 400 may store the universal concept graph in universal graph and content graph database 140.

In some example embodiments, the graph generating system 400 accesses the universal concept graph from the universal graph and content graph database 140. The universal concept graph includes a first set of nodes that represent concept phrases derived from the one or more internal documents associated with the SNS and from the one or more external documents that are external to the SNS. The universal concept graph also includes a first set of edges that connect a plurality of the nodes of the first set of nodes. The graph generating system 400 also accesses a content object associated with the SNS. In some instances, the content object is a member profile which may be stored in and accessed from the profile database 128. In certain instances, the content object is a job description document that may be stored in and accessed from the skills database 136 or another database (e.g., a recruitment database).

The graph generating system 400 generates an induced concept graph associated with the content object based on an analysis of the content object and the universal concept graph. The induced concept graph includes a second set of nodes that represent one or more concept phrases derived from the content object. The induced concept graph also includes a second set of edges that connect a plurality of nodes of the second set of nodes. The graph generating system 400 may store the induced concept graph in a record of the universal graph and content graph database 140.

The graph generating system 400 identifies one or more key concept phrases in the content object based on applying one or more key concept selection algorithms to the induced concept graph. The graph generating system 400 stores the one or more key concept phrases in association with an identifier of the content object in a record of a database (e.g., the universal graph and content graph database 140).

Other applications and services may be separately embodied in their own application server modules 124. As illustrated in FIG. 1, social networking system 120 may include the graph generating system 400, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, skill data, external data, universal graph data, or content graph data (e.g., an induced concept graph associated with a content object, key concept phrases associated with the content object, etc.), and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers of a large-scale distributed storage and processing framework, such as Hadoop servers, for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
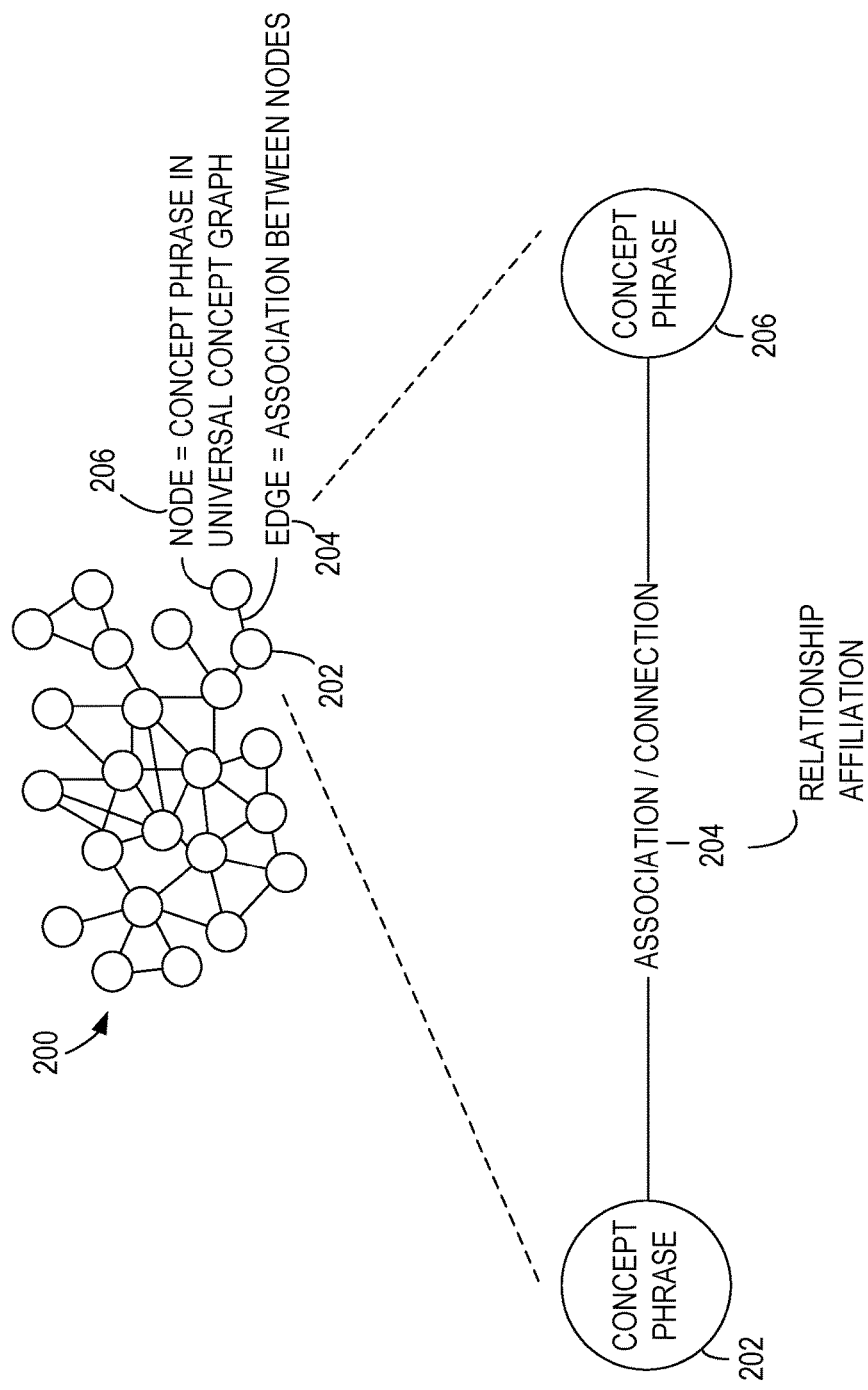
FIG. 2 is a diagram illustrating an example portion of a graph data structure for modelling a universal concept graph, consistent with some example embodiments.

FIG. 2 is a block diagram illustrating an example portion of a graph data structure 200 for implementing a universal concept graph, according to some example embodiments. As illustrated in FIG. 2, the graph data structure 200 consists of nodes connected by edges. For instance, the node with reference number 202 is connected to the node with reference number 206 by means of the edge with reference number 204. Each node in the graph data structure represents a concept phrase in the universal concept graph. The edges that connect any two nodes can represent a wide variety of different associations (e.g., connections). In general, an edge may represent a relationship, an affiliation, a commonality, or some other affinity shared between concept phrase 202 and concept phrase 206. For example, the concept phrase 202 is "Java," and the concept phrase 206 is "C++." The concept phrase 202 and the concept phrase 206 may be related based on both being programming languages. According to another example, the concept phrase 202 is "Patent Attorney," and the concept phrase 206 is "Copyright Attorney." The concept phrase 202 and the concept phrase 206 may be related based on both being Intellectual Property Attorneys.

Figure 3:
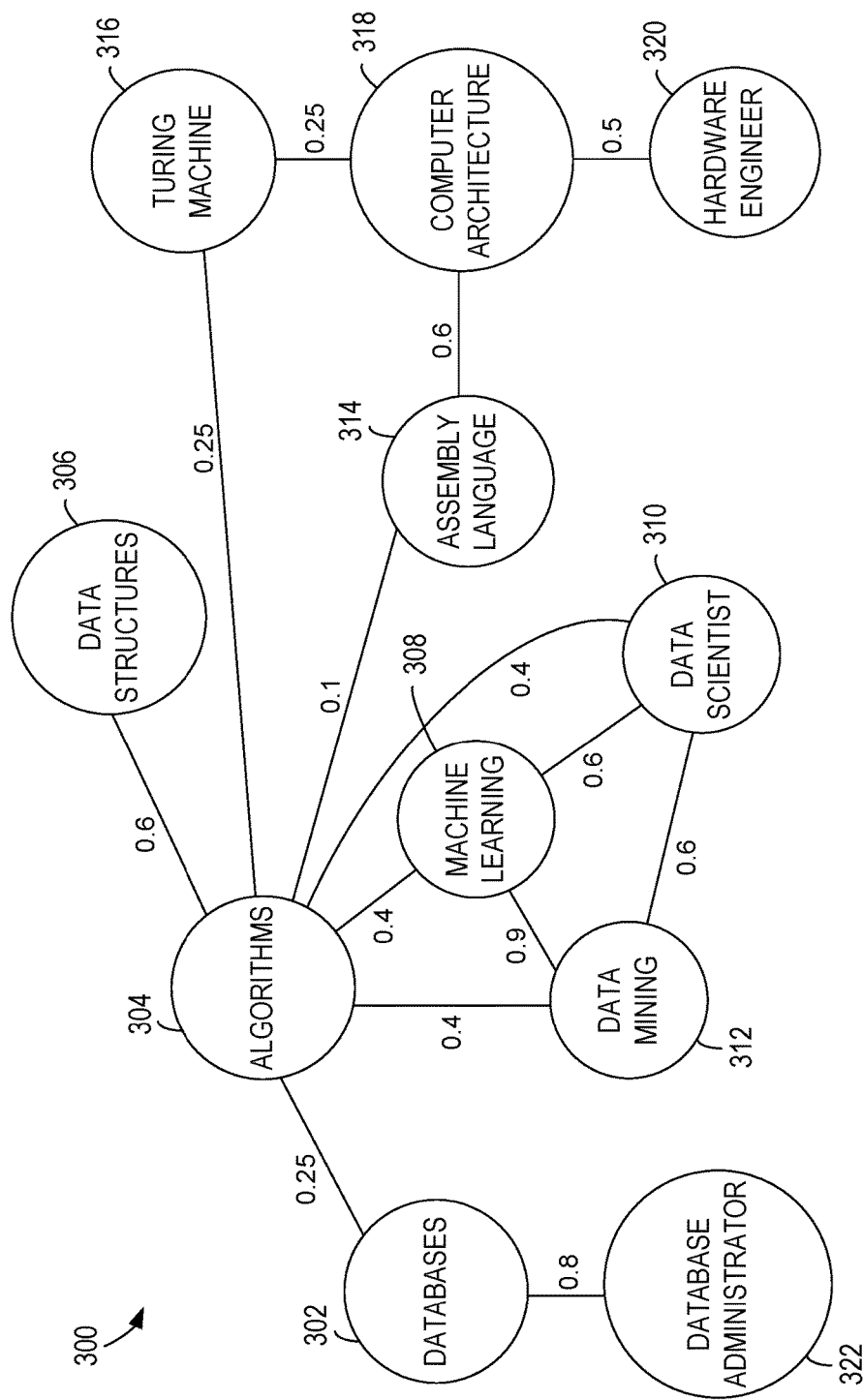
FIG. 3 is a diagram illustrating an example portion of the universal concept graph, consistent with some example embodiments.

FIG. 3 is a diagram illustrating an example portion of the universal concept graph, consistent with some example embodiments. As illustrated in FIG. 3, the example portion 300 of the universal concept graph consists of a number of nodes connected by a number of edges. Each node in the example portion 300 of the universal concept graph represents a concept phrase in the universal concept graph. The edges that connect any two nodes can represent a wide variety of different associations (e.g., connections). In general, an edge may represent a relationship, an affiliation, a commonality, or some other affinity shared between a pair of concept phrases.

For instance, the node with reference number 302 represents the concept phrase "databases," and is connected to the node with reference number 304 (representing the concept phrase "algorithms") by a first edge, and to the node with reference number 322 (representing the concept phrase "database administrator") by a second edge. The existence of these edges indicates the existence of relationships between the respective concept phrases.

In some example embodiments, each edge between two nodes of the universal concept graph is associated with an edge weight value. The edge weight value may be stored in association with an indicator (e.g., identifier) of an edge of the universal concept graph in a database (the universal graph and concept graph database 140). The edge weight value may represent the degree of relatedness between the two concept represented by the two nodes connected by the edge. For example, the node 304 that represents the concept phrase "algorithms" is connected to numerous other nodes, such as node 312 representing the concept phrase "data mining," node 306 representing the concept phrase "data structures," and node 314 representing the concept phrase "Assembly language." The edge between node 304 and node 312 is associated with an edge weight value of "0.4." The edge between node 304 and node 306 is associated with an edge weight value of "0.6." In some instances, the difference between these two edge weight values indicates that the phrase "algorithms" is more closely related to the concept phrase "data structures" than to the concept phrase "data mining."

The edge between node 304 and node 314 is associated with an edge weight value of "0.1." The low value of the edge weight between these two nodes indicates that the concept phrases "algorithms" and "Assembly language" are not closely related.

As shown in FIG. 3, the example portion 300 of the universal concept graph, in some example embodiments, includes concept phrases that correspond to skills (or knowledge) of the members of the SNS (e.g., node 302, node 304, node 306, node 308, node 310, node 312, node 314, node 316, and node 318). The example portion 300 of the universal concept graph also includes concept phrases that correspond to job titles (e.g., node 322 and node 320).

In some example embodiments, the edges connecting a node representing a particular job title and a node representing a particular skill may be weighted to indicate how important the particular skill is to the job associated with the particular job title. For example, node 322 that represents the concept phrase "database administrator," a job title phrase, is connected by an edge to node 302 that represents the concept phrase "databases," a skill phrase. The edge is associated with the edge weight value of "0.8," which indicates that the concept phrase "databases" is highly related to the concept phrase "database administrator," and that the skill "databases" is highly important to the job associated with the job title "database administrator."

Figure 4:
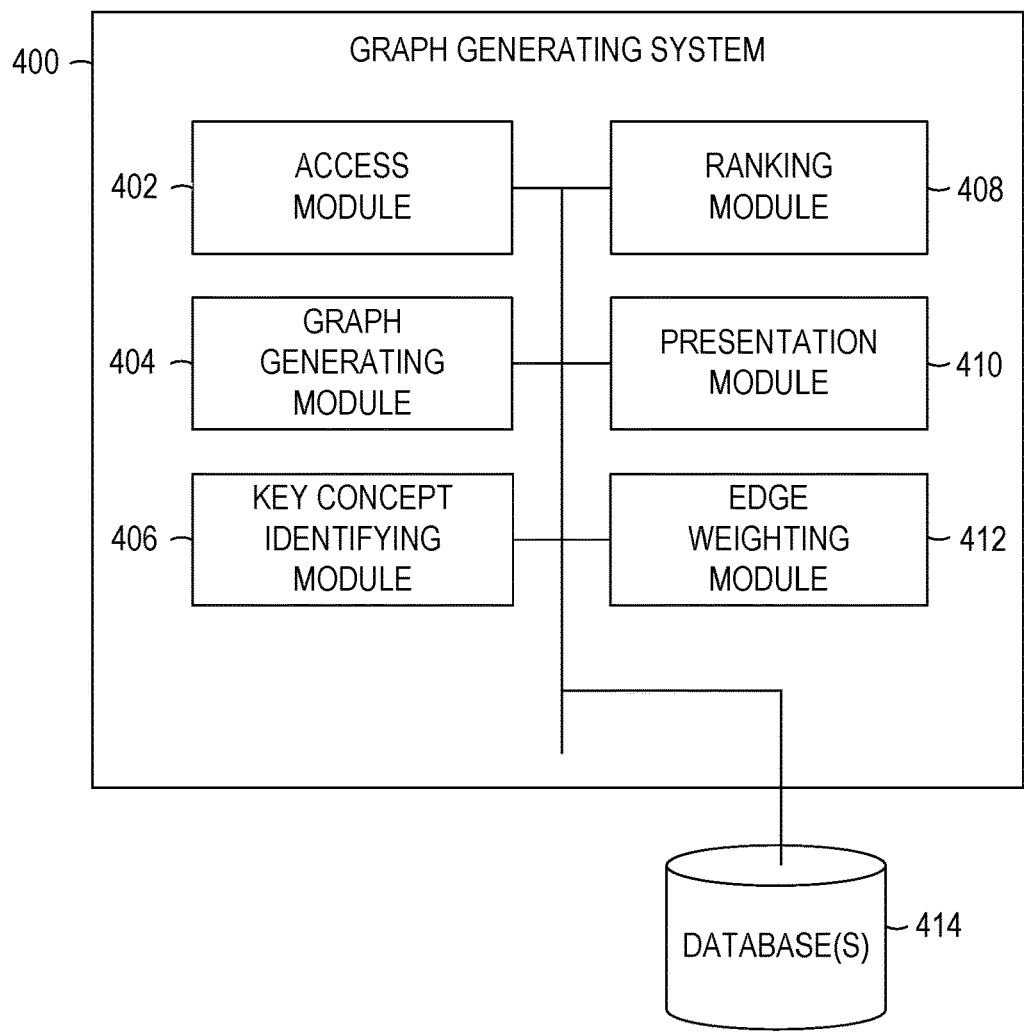
FIG. 4 is a block diagram illustrating components of a graph generating system, according to some example embodiments.

FIG. 4 is a block diagram illustrating components of the graph generating system 400, according to some example embodiments. As shown in FIG. 4, the graph generating system 400 includes an access module 402, a graph generating module 404, a key concept identifying module 406, a ranking module 408, a presentation module 410, and an edge weighting module 412, all configured to communicate with each other (e.g., via a bus, shared memory, or a switch).

According to some example embodiments, the access module 402 accesses a universal concept graph from a database (e.g., database 414). The universal concept graph includes a first set of nodes that represent concept phrases derived from one or more internal documents associated with a social networking service (SNS) and one or more external documents that are external to the SNS. The universal concept graph also includes a first set of edges that connect a plurality of nodes of the first set of nodes.

The access module 402 also accesses a content object (e.g., a document such as a member profile, a job description, a news article, etc.) associated with the SNS from a database (e.g., database 414).

The graph generating module 404 generates an induced concept graph associated with the content object based on an analysis of the content object and the universal concept graph. The induced graph includes a second set of nodes that represent one or more concept phrases derived from the content object. The induced graph also includes a second set of edges that connect a plurality of nodes of the second set of nodes.

In some example embodiments, the generating of the induced concept graph associated with the content object, by the graph generating module 404, includes generating a set of tokens based on the content object, mapping one or more tokens of the set of tokens to one or more nodes of the first set of nodes included in the universal concept graph, and generating a candidate set of concept phrases for the content object based on the mapping of the one or more tokens of the set of tokens to the one or more nodes of the first set of nodes.

In certain example embodiments, the generating of the induced concept graph associated with the content object, by the graph generating module 404, includes accessing a candidate set of concept phrases for the content object, mapping a pair of concept phrases of the candidate set to a first pair of nodes in the universal concept graph, identifying a first edge of the first set of edges that connects the first pair of nodes in the universal concept graph, and generating the second set of edges to be included in the induced concept graph. The generating of the second set of edges is based on the identified first edge that connects the first pair of nodes in the universal concept graph. The second set of edges includes a second edge to connect a second pair of nodes corresponding to the pair of concept phrases of the candidate set.

In various example embodiments, the graph generating module 404 generates the second set of nodes to be included in the induced concept graph. The second set of nodes includes the second pair of nodes to be connected by the second edge. The generating of the second set of nodes is based on the candidate set of concept phrases for the content object and the second edge to connect a second pair of nodes corresponding to the pair of concept phrases of the candidate set. The graph generating module 404 also generates the induced concept graph based on the second set of nodes and the second set of edges. The induced concept graph includes the second pair of nodes connected by the second edge.

The key concept identifying module 406 identifies one or more key concept phrases in the content object based on applying one or more key concept selection algorithms to the induced concept graph. In some example embodiments, the identifying of the one or more key concept phrases includes selecting the key concept phrases from the one or more concept phrases derived from the content object. The selecting may be performed according to a particular key concept selection algorithm of the one or more key concept selection algorithms.

The key concept identifying module 406 also stores the one or more key concept phrases in a record of a database (e.g., database 414). The record may reference (e.g., be associated with) an identifier of the content object, such as a name of the content object.

In some example embodiments, the content object includes a field of a member profile of a member of the SNS. The key concept identifying module 406 may identify the one or more key concept phrases in the field of the member profile.

In certain example embodiments, the field of the member profile is a first field of the member profile. The identifying of the one or more key concept phrases in the content object, by the key concept identifying module 406, may include identifying a set of key concept phrases in the member profile based on identifying one or more key concept phrases in the first field of the member profile and identifying one or more key concept phrases in a second field of the member profile.

The ranking module 408 generates one or more intermediate rankings of the key concept phrases of the content object according to the particular key concept selection algorithm. In some example embodiments, the ranking module 408 also generates a combined ranking of the key concept phrases based on combining the one or more intermediate rankings of the key concept phrases of the content object according to a rank aggregation technique.

The presentation module 410 causes a presentation of at least a portion of the induced concept graph in a user interface of a device associated with a user.

The edge weighting module 412 identifies an edge weight value associated with the first edge of the first set of edges included in the universal concept graph. The edge weighting module 412 associates the edge weight value with the second edge that connects the second pair of nodes included in the induced concept graph.

To perform one or more of its functionalities, the graph generating system 400 may communicate with one or more other systems. For example, an integration engine may integrate the graph generating system 400 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 414 (e.g., database 128, 130, 132, 136, 138, or 140).

Figure 5:
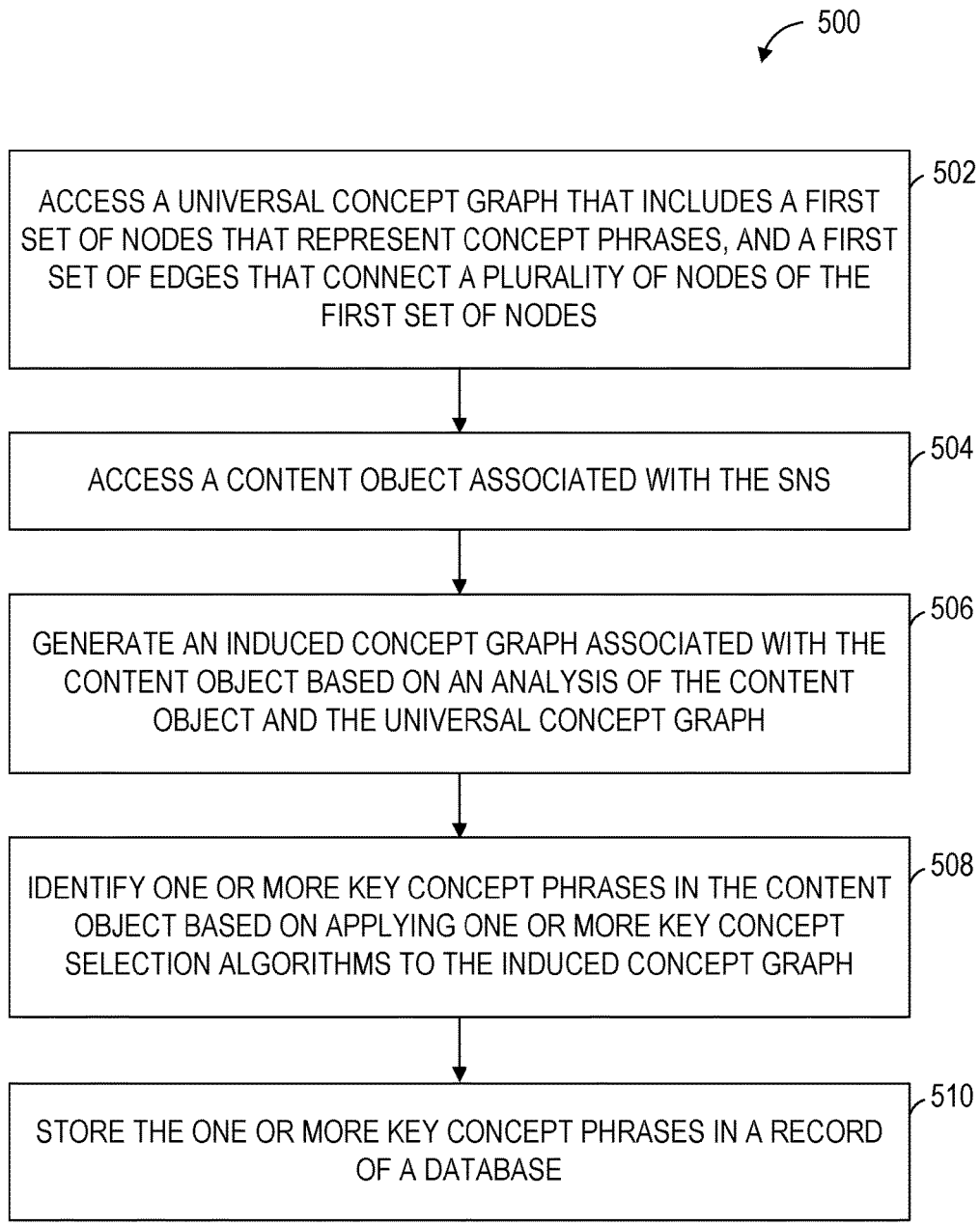
FIG. 5 is a flowchart illustrating a method for determining key concepts in documents based on a universal concept graph, according to some example embodiments.

FIGS. 5-11 are flowcharts illustrating a method for determining key concepts in documents based on a universal concept graph associated with a social networking service, according to some example embodiments. The operations of method 500 illustrated in FIG. 5 may be performed using modules described above with respect to FIG. 4. As shown in FIG. 5, method 500 may include one or more of method operations 502, 504, 506, 508, and 510, according to some example embodiments.

At operation 502, the access module 402 accesses a universal concept graph from a database 414 (e.g., e.g., database 128, 130, 132, 136, 138, or 140, or another database). The universal concept graph includes a first set of nodes that represent concept phrases derived from one or more internal documents associated with a social networking service (SNS) and one or more external documents that are external to the SNS. The universal concept graph also includes a first set of edges that connect a plurality of nodes of the first set of nodes.

At operation 504, the access module 402 accesses a content object associated with the SNS from a database (e.g., database 414). Examples of content objects are a member profile, a job description or posting, a SlideShare document, a Pulse article, etc.

At operation 506, the graph generating module 404 generates an induced concept graph associated with the content object based on an analysis of the content object and the universal concept graph. The induced graph includes a second set of nodes that represent one or more concept phrases derived from the content object. The induced graph also includes a second set of edges that connect a plurality of nodes of the second set of nodes.

At operation 508, the key concept identifying module 406 identifies one or more key concept phrases in the content object based on applying one or more key concept selection algorithms to the induced concept graph.

In some example embodiments, the content object includes a field of a member profile of a member of the SNS. The one or more key concept phrases are identified, by the key concept identifying module 406, in the field of the member profile.

In various example embodiments, the field of the member profile is a first field of the member profile. The identifying of the one or more key concept phrases in the content object, by the key concept identifying module 406, includes identifying a set of key concept phrases in the member profile based on identifying one or more key concept phrases in the first field of the member profile and identifying one or more key concept phrases in a second field of the member profile.

At operation 510, the key concept identifying module 406 stores the one or more key concept phrases in a record of a database. The record may reference (e.g., be associated with) the content object.

In some example embodiments, the presentation module 410 causes a presentation of at least a portion of the induced concept graph in a user interface of a device associated with a user.

Further details with respect to the operations of the method 500 are described below with respect to FIGS. 6-11.

Figure 6:
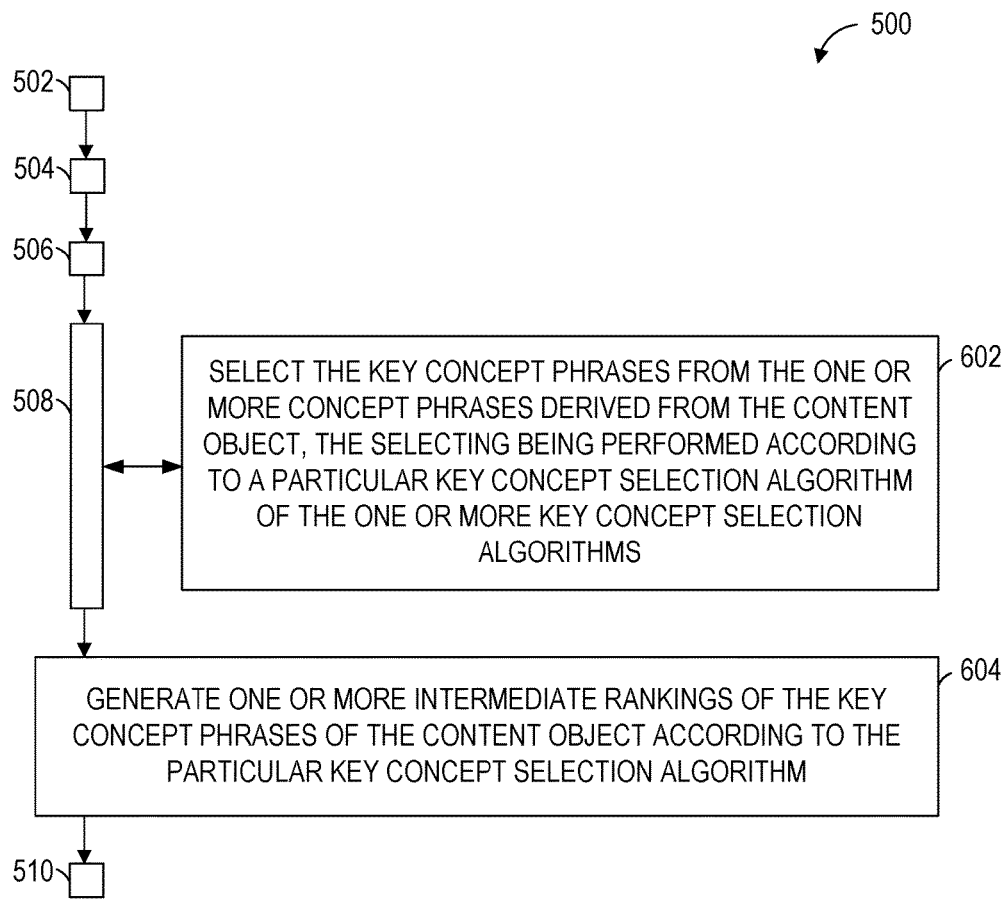
FIG. 6 is a flowchart illustrating a method for determining key concepts in documents based on a universal concept graph, and representing step 508 of the method illustrated in FIG. 5 in more detail and an additional step of the method illustrated in FIG. 5, according to some example embodiments.

As shown in FIG. 6, method 500 may include one or more of operations 602 and 604, according to some example embodiments. Operation 602 may be performed as part (e.g., a precursor task, a subroutine, or a portion) of operation 508, in which the key concept identifying module 406 identifies one or more key concept phrases in the content object based on applying one or more key concept selection algorithms to the induced concept graph.

At operation 602, the key concept identifying module 406 selects the key concept phrases from the one or more concept phrases derived from the content object. The selecting may be performed according to a particular key concept selection algorithm of the one or more key concept selection algorithms.

Operation 604 may be performed after operation 508. At operation 604, the ranking module 408 generates one or more intermediate rankings of the key concept phrases of the content object according to the particular key concept selection algorithm.

In certain example embodiments, a first key concept selection algorithm provides that the graph generating system iteratively removes leaf nodes (e.g., first degree nodes) from the induced concept graph associated with the content object until a desired number of key concept phrases are left. The degree of a node is equal to the number of other nodes to which it is connected. The desired number of key concept phrases left comprise the set of key concept phrases associated with the content object. The induced concept graph may be a weighted graph (e.g., each edge of the induced concept graph is associated with an edge weight value).

For example, assuming that the example portion 300 of FIG. 3 represents an induced concept graph associated with a content object and that the first key concept selection algorithm is applied to the induced concept graph, the graph generating system removes the nodes 322 (e.g., "database administrator"), 320 (e.g., "hardware engineer"), and 306 (e.g., "data structures") as being leaf nodes (e.g., first degree nodes) in the induced concept graph. Once these nodes are removed, some other nodes may become leaf nodes (e.g., node 302 "databases"). The graph generating system compares the number of nodes left in the induced concept graph and the number of desired nodes that represent the key concept phrases in the content object. If the number of nodes left is greater than the number of desired nodes, then the graph generating system removes more leaf nodes. Based on an iterative application of this algorithm, the graph generating system identifies the nodes in the induced concept graph that represent the key concept phrases in the content object.

In certain example embodiments, the induced concept graph is a weighted graph (e.g., each edge of the induced concept graph is associated with an edge weight value). A second key concept selection algorithm provides that, for each node in the induced concept graph, the graph generating system aggregates the edge weight values of all the edges that connect the particular node to other nodes. The aggregating results in a total weight value for the particular node. The graph generating system associates the total weight value with the particular node.

For example, assuming that the example portion 300 of FIG. 3 represents an induced concept graph associated with a content object and that the second key concept selection algorithm is applied to the induced concept graph, the graph generating system determines that the node 302 "databases" has two edges: a first edge that connects node 302 "databases" with node 304 "algorithms" and a second edge that connects node 302 "databases" with node 322 "database administrator." The graph generating system determines that the edge weight value associated with the first edge is 0.25, and the edge weight value associated with the second edge is 0.80. The graph generating system aggregates the edge weight values associated with the first edge and the second edge and generates a total weight value of "1.05." The graph generating system associates the total weight value of "1.05" with node 302 "databases" of the induced concept graph. The graph generating system also determines the total weight value for the other nodes of the induced concept graph.

The graph generating system may then rank the nodes of the induced concept graph based on their total weight values in a decreasing order. The graph generating system may select a top k nodes from the list of ranked nodes, wherein k is the desired number of key concept values in the content object.

In various example embodiments, the induced concept graph is a weighted graph. A third key concept selection algorithm provides that the graph generating system performs a random walk (e.g., PageRank) computation of the induced weighted concept graph and returns the top k nodes (e.g., the desired number of nodes that represent the key concept phrases) with the largest stationary distribution value.

For example, assuming that the example portion 300 of FIG. 3 represents an induced concept graph associated with a content object and that the third key concept selection algorithm is applied to the induced concept graph, the graph generating system starts the random walk from any node in the induced concept graph (e.g., node 310 "data scientist"). In each step, the graph generating system randomly "walks" to a neighbor node with a likelihood of going to a particular node proportional to the edge weight value of the edge to the particular node. For example, the probability of going from node 310 "data scientist" to node 304 "algorithms" is 0.40/(0.60+0.60+0.40), where "0.40" is the edge weight value between node 310 "data scientist" and node 304 "algorithms," "0.60" is the edge weight value between node 310 "data scientist" and node 308 "machine learning," and "0.60" is the edge weight value between node 310 "data scientist" and node 312 "data mining."

Once the random walk is performed for a large number of steps (e.g., one thousand steps), the graph generating system determines how many times each node was visited. The graph generating system may divide, for each node, the number of visits to that node by total number of steps (e.g., one thousand steps) to obtain the stationary distribution value associated with each node. In some instances, the higher the stationary distribution value associated with a particular node, the more important the concept phrase represented by the particular node.

The graph generating system may rank the nodes in the induced concept graph based on their stationary distribution values in a decreasing order. The graph generating system may select a top k nodes from the list of ranked nodes, wherein k is the desired number of key concept values in the content object.

In certain example embodiments, a fourth key concept selection algorithm provides that the graph generating system, for every node in the induced concept graph, calculates the average number of steps to randomly walk from that node to a different node in the induced concept graph via various paths. The induced concept graph may be a weighted graph (e.g., each edge of the induced concept graph is associated with an edge weight value).

For example, assuming that the example portion 300 of FIG. 3 represents an induced concept graph associated with a content object and that the third key concept selection algorithm is applied to the induced concept graph, the graph generating system determines that to go from node 310 "data scientist" to node 312 "data mining," three paths may be taken (e.g., a first direct path from node 310 "data scientist" to node 312 "data mining," a second indirect path via node 308 "machine learning" and node 304 "algorithms," and a third indirect path via node 304 "algorithms") and, on average, 2.00 steps are needed (e.g., (1 step for the first direct path+3 steps for the second indirect path+2 steps for the third indirect path)/3 paths). The graph generating system also computes the average number of steps (e.g., the average step value) to reach other nodes from node 310 "data scientist" (e.g., the average step value to reach node 308 "machine learning" is 1.66, the average step value to reach node 304 "algorithms" is 1.66, etc.). The graph generating system aggregates all the average step values associated with node 310 "data scientist," which, for example, results in 13.50. This is considered the combined commute value from node 310 "data scientist." The graph generating system associates the combined commute value with node 310 "data scientist."

Similarly, the graph generating system computes the average number of steps to reach other nodes from each of the other nodes of the induced concept graph, and generates a combined commute value for each of the other nodes of the induced concept graph. For example, the combined commute value for node 312 "data mining" is 11.50, for node 304 "algorithms" is 10.50, for node 306 "data structures" is 21.50, and for node 308 "machine learning" is 10.50. The graph generating system ranks the nodes in the induced concept graph based on their combined commute values. In some example embodiments, the graph generating system selects the node with the lowest combined commute value as the most important node representing the most important concept in the content object. In various example embodiments, the graph generating system select k nodes with the lowest combined commute values as the key concepts in the content object represented by the induced concept graph.

Figure 7:
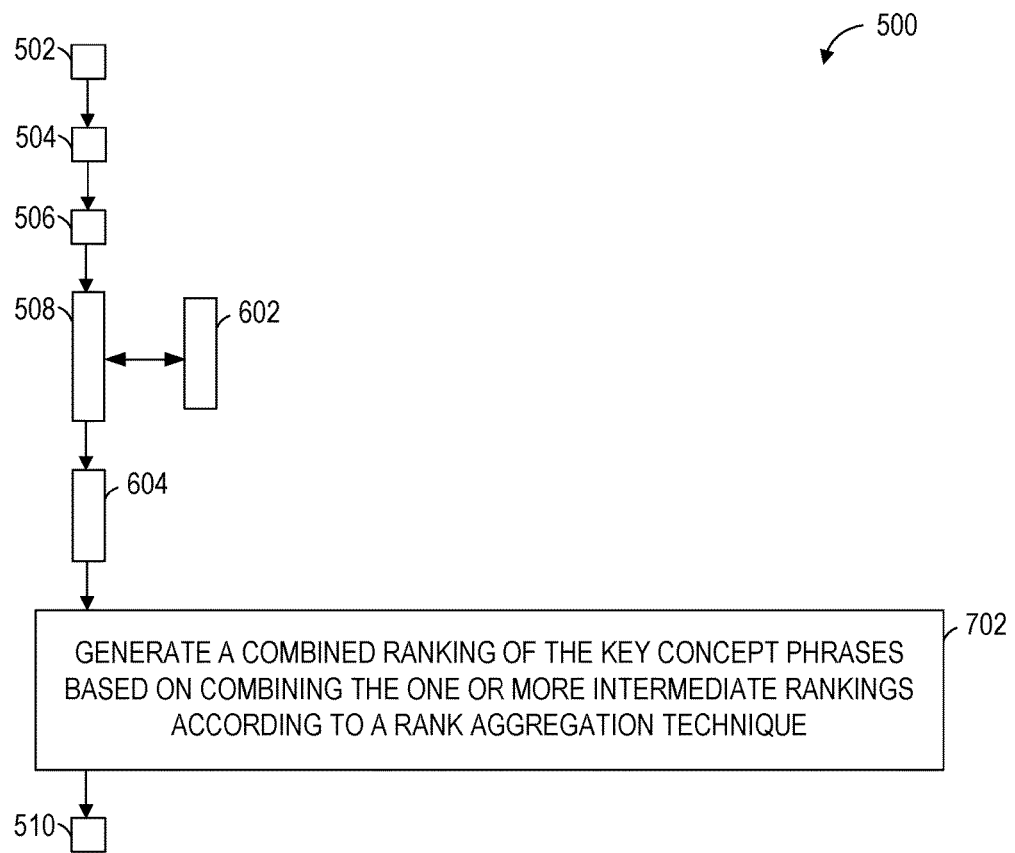
FIG. 7 is a flowchart illustrating a method for determining key concepts in documents based on a universal concept graph, and representing an additional step of the method illustrated in FIG. 6, according to some example embodiments.

As shown in FIG. 7, method 500 may include operation 702, according to some example embodiments. Operation 702 may be performed after operation 604 of method 500 illustrated in FIG. 6, in which the ranking module 408 generates one or more intermediate rankings of the key concept phrases of the content object according to the particular key concept selection algorithm.

At operation 702, the ranking module 408 generates a combined ranking of the key concept phrases based on combining the one or more intermediate rankings of the key concept phrases of the content object according to a rank aggregation technique.

For example, the ranking module 408 accesses the resulting rankings of applying the various key concept selection algorithms (e.g., the one or more intermediate rankings of the key concept phrases of the content object). For every key concept, the ranking module 408 sums up the ranking positions obtained under the various key concept selection algorithms. For example, it may be assumed that a first key concept selection algorithm ranks "data mining" first, "algorithms" second, and "machine learning" third. A second key concept selection algorithm ranks "machine learning" first, "algorithms" second, and "data mining" third. A third key concept selection algorithm ranks "machine learning" first, "data mining" second, and "algorithms" third. The ranking module 408 aggregates, for each of these key concept phrases, the ranking positions obtained under the various key concept selection algorithms to generate a combined position value for each key concept value. Accordingly, for "data mining," the sum is 6, for "algorithms," the sum is 7, and for "machine learning," the sum is 5. The ranking module 408 ranks the key concepts based on their combined position values to obtain a final order of importance of key concepts in the document. The key concept value with the lowest combined position value is considered the most important key concept in the content object.

Figure 8:
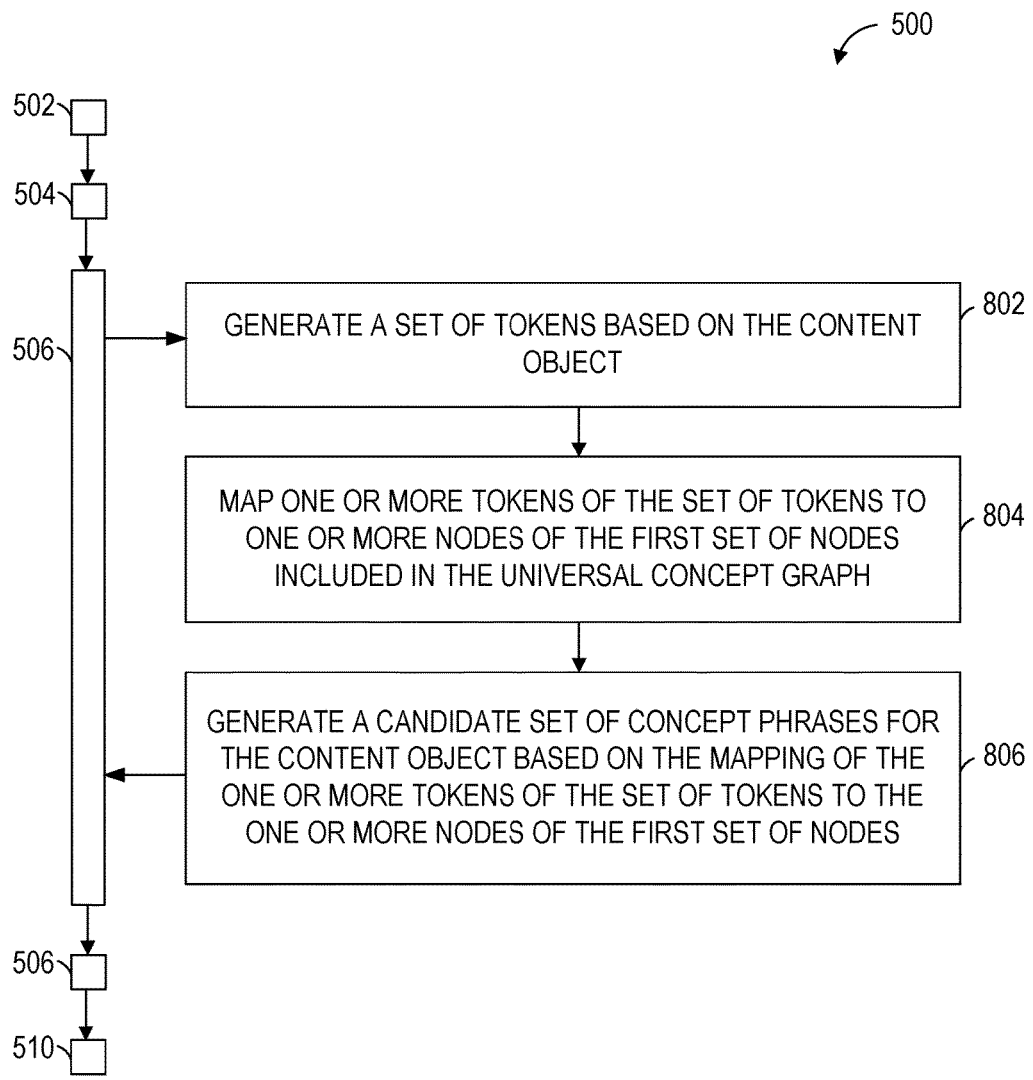
FIG. 8 is a flowchart illustrating a method for determining key concepts in documents based on a universal concept graph, and representing step 506 of the method illustrated in FIG. 5 in more detail, according to some example embodiments.

As shown in FIG. 8, method 500 may include one or more of operations 802, 804, or 806, according to some example embodiments. Operation 802 may be performed as part (e.g., a precursor task, a subroutine, or a portion) of operation 506 of method 500 illustrated in FIG. 5, in which the graph generating module 404 generates an induced concept graph associated with the content object based on an analysis of the content object and the universal concept graph.

At operation 802, the graph generating module 404 generates a set of tokens based on the content object. For example, the set of tokens may be generated based on the content of (e.g., the words included in) a document such a member profile of a member of the SNS or a job description posted to the SNS by a recruiter. A token may be a unigram, a biagram, a trigram, etc. generated based on the content of the content object. When generating the tokens, the graph generating module 404 may remove stop words or other words that are not considered relevant for the generation of the tokens from the content object.

In some example embodiments, the graph generating module 404 generates a canonical version of one or more tokens in the set of tokens based on mapping the one or more tokens to one or more external concept phrases in an external dataset (e.g., Wikipedia).

Operation 804 may be performed after operation 802. At operation 804, the graph generating module 404 maps one or more tokens of the set of tokens to one or more nodes of the first set of nodes included in the universal concept graph. The mapping may include identifying the one or more nodes of the first set of nodes included in the universal concept graph that correspond to the one or more tokens of the set of tokens. The mapped concepts appear both in the content object and in the universal concept graph.

Operation 806 may be performed after operation 804. At operation 806, the graph generating module 404 generates a candidate set of concept phrases for the content object. The generating of the candidate set of concept phrases for the content object may be based on the mapping of the one or more tokens of the set of tokens to the one or more nodes of the first set of nodes.

Figure 9:
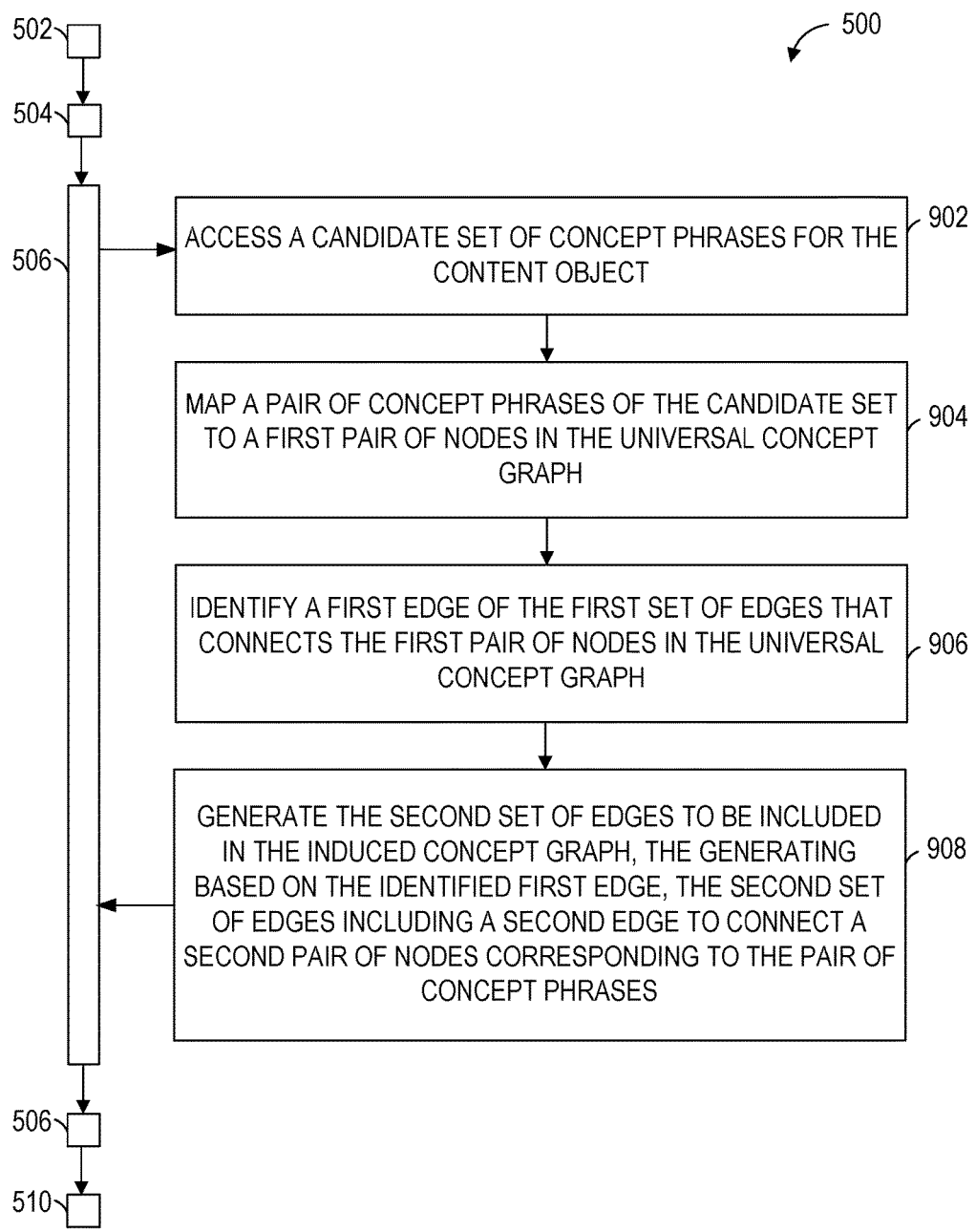
FIG. 9 is a flowchart illustrating a method for determining key concepts in documents based on a universal concept graph, and representing step 506 of the method illustrated in FIG. 5 in more detail, according to some example embodiments.

As shown in FIG. 9, method 500 may include one or more of operations 902, 904, 906, or 908, according to some example embodiments. Operation 902 may be performed as part (e.g., a precursor task, a subroutine, or a portion) of operation 506 of method 500 illustrated in FIG. 5, in which the graph generating module 404 generates an induced concept graph associated with the content object based on an analysis of the content object and the universal concept graph.

At operation 902, the graph generating module 404 accesses a candidate set of concept phrases for the content object from a record of a database (e.g., database 414).

Operation 904 may be performed after operation 902. At operation 904, the graph generating module 404 maps a pair of concept phrases of the candidate set to a first pair of nodes in the universal concept graph.

Operation 906 may be performed after operation 904. At operation 906, the graph generating module 404 identifies a first edge of the first set of edges that connects the first pair of nodes in the universal concept graph.

Operation 908 may be performed after operation 906. At operation 908, the graph generating module 404 generates the second set of edges to be included in the induced concept graph. The generating may be based on the identified first edge that connects the first pair of nodes in the universal concept graph. The second set of edges includes a second edge to connect a second pair of nodes corresponding to the pair of concept phrases of the candidate set in the induced concept graph associated with the content object. The second set of edges may be stored in a record of a database (e.g., database 414). An identifier of the second edge may be stored in the record of the database in association with identifiers of the nodes included in the second pair of nodes to be connected by the second edge in the induced concept graph associated with the content object.

Figure 10:
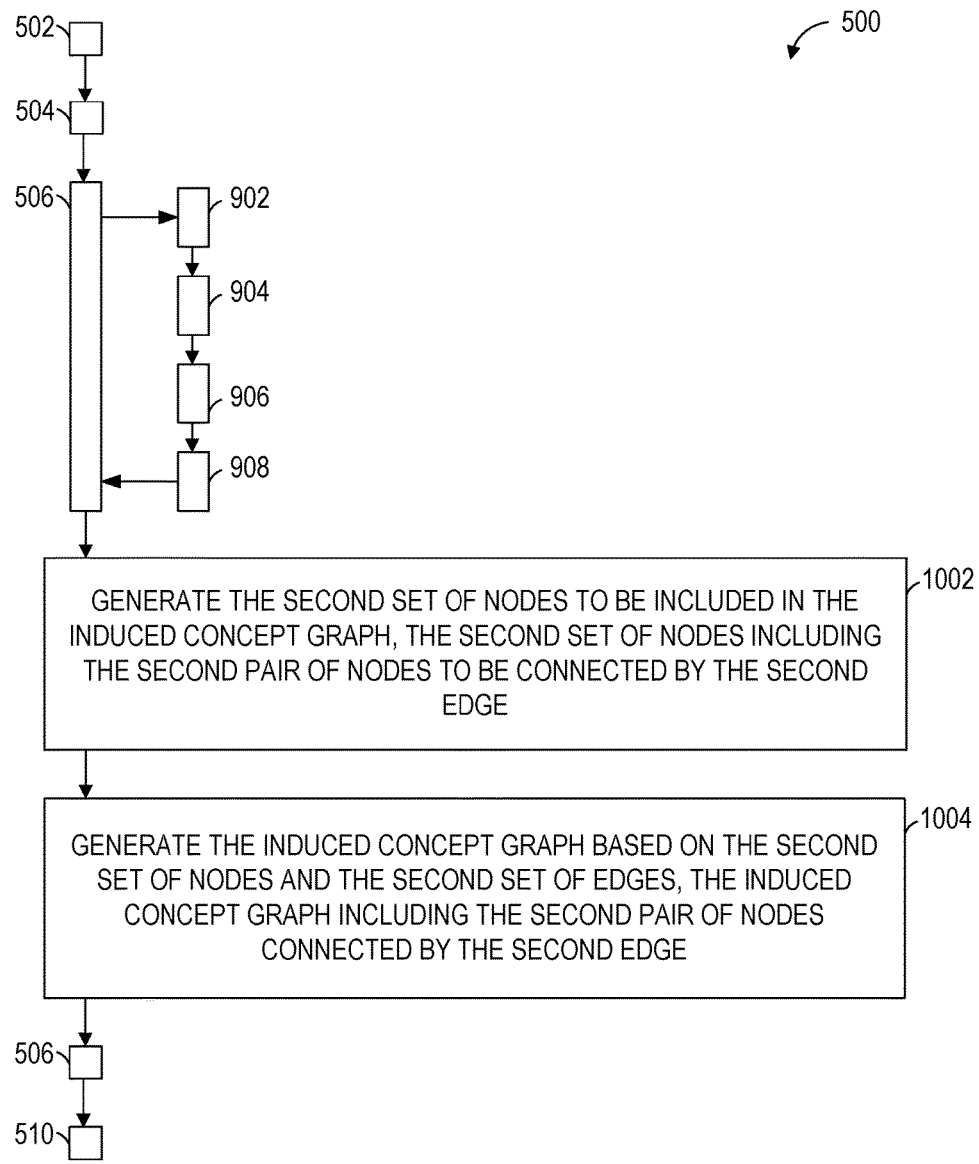
FIG. 10 is a flowchart illustrating a method for determining key concepts in documents based on a universal concept graph, and representing additional steps of the method illustrated in FIG. 9, according to some example embodiments.

As shown in FIG. 10, method 500 may include one or more of operations 1002 and 1004, according to some example embodiments. Operation 1002 may be performed after operation 506 of method 500 as illustrated in FIG. 9, in which in which the graph generating module 404 generates an induced concept graph associated with the content object based on an analysis of the content object and the universal concept graph.

At operation 1002, the graph generating module 404 generates the second set of nodes to be included in the induced concept graph. The generating of the second set of nodes may be based on the candidate set of concept phrases for the content object and the second edge. The second set of nodes includes the second pair of nodes to be connected by the second edge in the induced concept graph associated with the content object.

Operation 1004 may be performed after operation 1002. At operation 1004, the graph generating module 404 generates the induced concept graph based on the second set of nodes and the second set of edges. The induced concept graph includes the second pair of nodes connected by the second edge.

Figure 11:
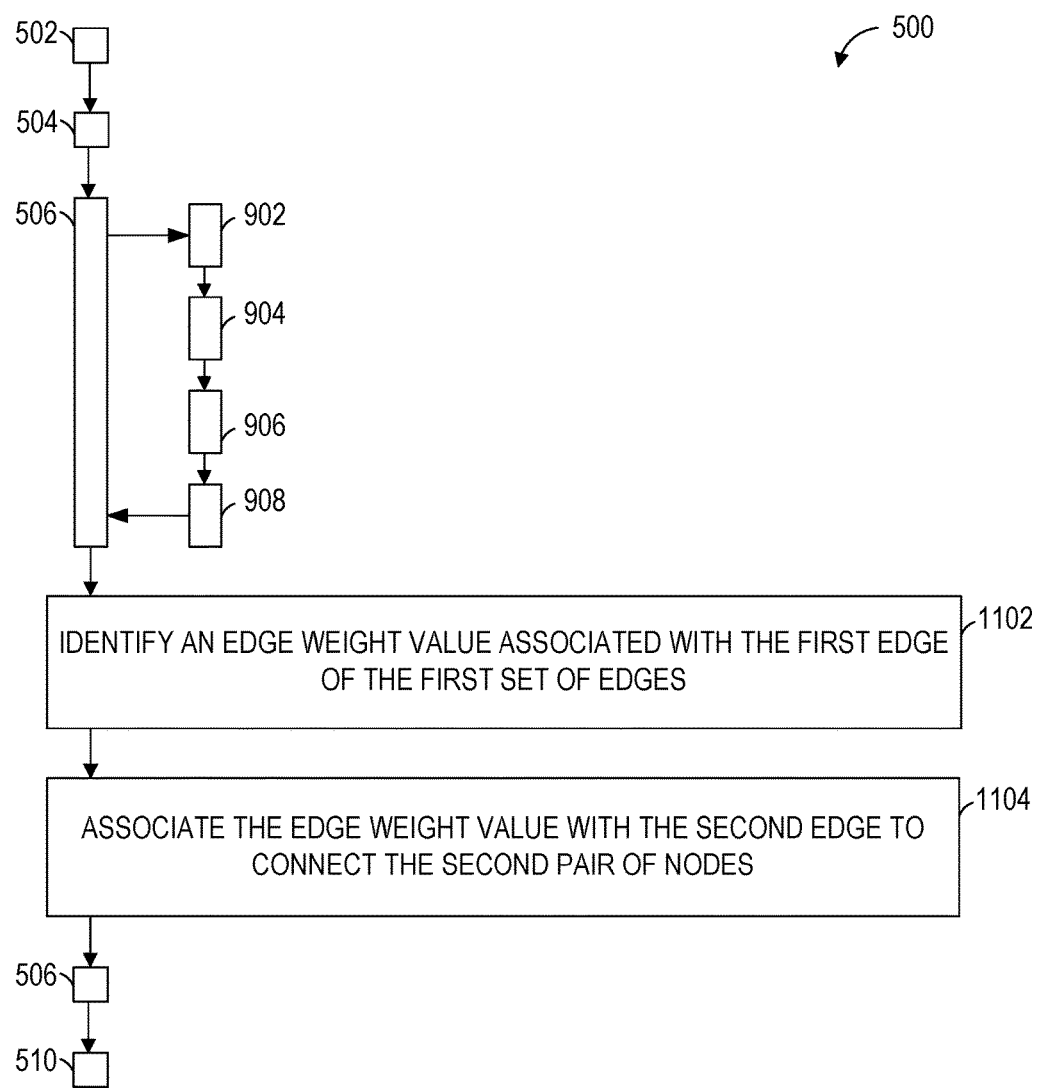
FIG. 11 is a flowchart illustrating a method for determining key concepts in documents based on a universal concept graph, and representing additional steps of the method illustrated in FIG. 9, according to some example embodiments.

As shown in FIG. 11, method 500 may include one or more of operations 1102 and 1104, according to some example embodiments. Operation 1102 may be performed after operation 506 of method 500 as illustrated in FIG. 9, in which in which the graph generating module 404 generates an induced concept graph associated with the content object based on an analysis of the content object and the universal concept graph.

At operation 1102, the edge weighting module 412 identifies an edge weight value associated with the first edge of the first set of edges included in the universal concept graph. The identifying of the edge weight value associated with the first edge may be based on accessing a record of a database (e.g., database 414) that stores an identifier of the first edge in association with the edge weight value.

Operation 1104 may be performed after operation 1102. At operation 1104, the edge weighting module 412 associates the edge weight value with the second edge that connects the second pair of nodes included in the induced concept graph. In some example embodiments, the edge weighting module 412 stores the edge weight value as associated with the second edge in a record of a database (e.g., database 414).

Example Mobile Device

Figure 12:
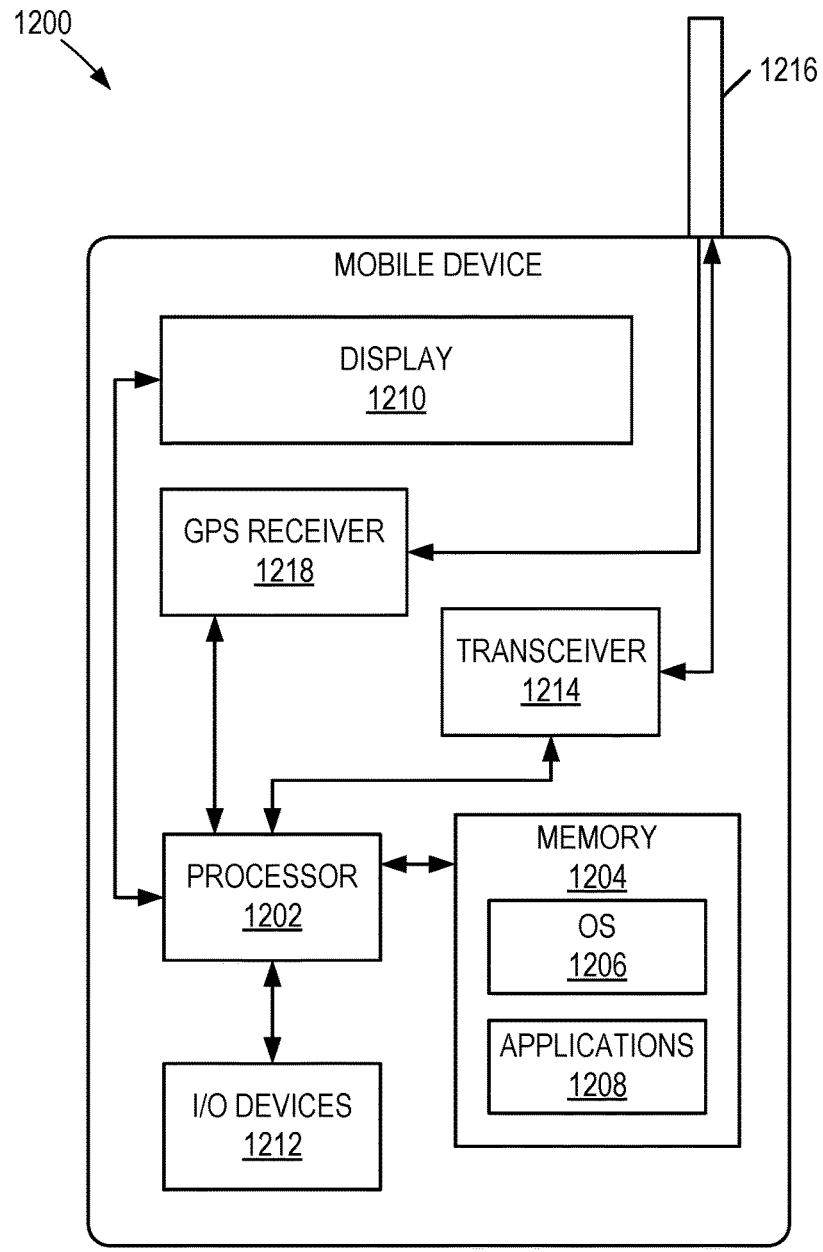
FIG. 12 is a block diagram illustrating a mobile device, according to some example embodiments.

FIG. 12 is a block diagram illustrating a mobile device 1200, according to an example embodiment. The mobile device 1200 may include a processor 1202. The processor 1202 may be any of a variety of different types of commercially available processors 1202 suitable for mobile devices 1200 (for example, an XScale architecture microprocessor, a microprocessor without interlocked pipeline stages (MIPS) architecture processor, or another type of processor 1202). A memory 1204, such as a random access memory (RAM), a flash memory, or other type of memory, is typically accessible to the processor 1202. The memory 1204 may be adapted to store an operating system (OS) 1206, as well as application programs 1208, such as a mobile location enabled application that may provide LBSs to a user. The processor 1202 may be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 may be coupled to a transceiver 1214 that interfaces with an antenna 1216. The transceiver 1214 may be configured to both transmit and receive cellular network signals, wireless data signals, or other types of signals via the antenna 1216, depending on the nature of the mobile device 1200. Further, in some configurations, a GPS receiver 1218 may also make use of the antenna 1216 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
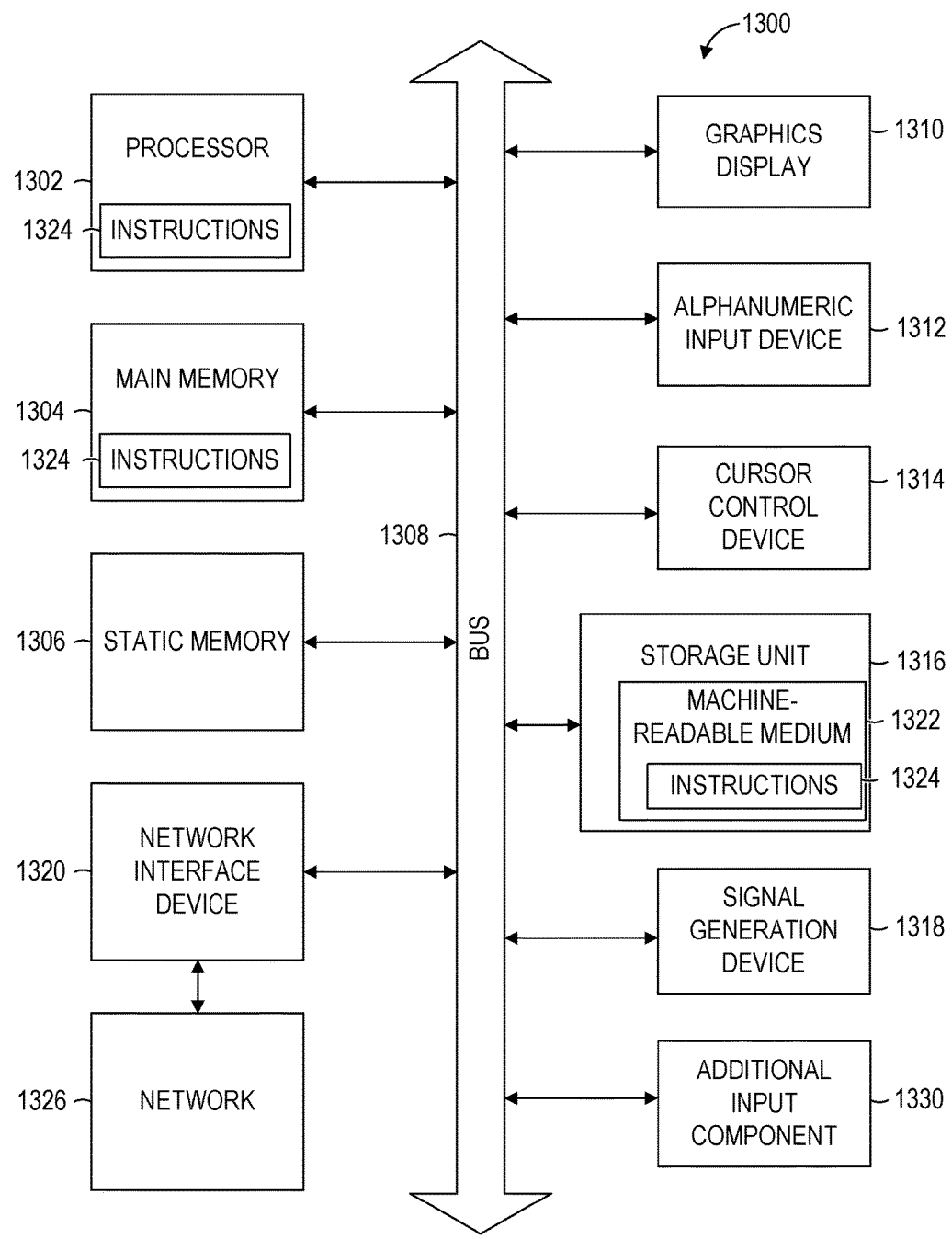
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 1326 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing a universal concept graph that includes a first set of nodes that represent concept phrases derived from one or more internal documents associated with a social networking service (SNS) and one or more external documents that are external to the SNS, and a first set of edges that connect a plurality of nodes of the first set of nodes;
accessing a content object associated with the SNS;
generating, using one or more hardware processors, an induced concept graph associated with the content object based on analysis of the content object and the universal concept graph, the induced graph including a second set of nodes that represent one or more concept phrases derived from the content object and a second set of edges that connect a plurality of nodes of the second set of nodes;
identifying one or more key concept phrases in the content object based on applying one or more key concept selection algorithms to the induced concept graph, a first key concept selection algorithm of the one or more key concept selection algorithms iteratively removing leaf nodes from the induced concept graph associated with the content object until a desired number of nodes representing key concept phrases are left, a leaf node being connected solely to one other node; and
storing the one or more key concept phrases in a record of a database, the record referencing the content object.

2. The method of claim 1, wherein the identifying of the one or more key concept phrases includes:
selecting the key concept phrases from the one or more concept phrases derived from the content object, the selecting being performed according to a further key concept selection algorithm of the one or more key concept selection algorithms;
the method further comprising:
generating one or more intermediate rankings of the key concept phrases of the content object according to the further key concept selection algorithm.

3. The method of claim 2, further comprising:
generating a combined ranking of the key concept phrases based on combining the one or more intermediate rankings of the key concept phrases of the content object according to a rank aggregation technique.

4. The method of claim 1, wherein the content object includes a field of a member profile of a member of the SNS, and wherein the one or more key concept phrases are identified in the field of the member profile.

5. The method of claim 4, wherein the field of the member profile is a first field of the member profile, and
wherein the identifying of the one or more key concept phrases in the content object includes identifying a set of key concept phrases in the member profile based on identifying one or more key concept phrases in the first field of the member profile and identifying one or more key concept phrases in a second field of the member profile.

6. The method of claim 1, further comprising:
causing a presentation of at least a portion of the induced concept graph in a user interface of a device associated with a user.

7. The method of claim 1, wherein the generating of the induced concept graph associated with the content object includes:
generating a set of tokens based on the content object;
mapping one or more tokens of the set of tokens to one or more nodes of the first set of nodes included in the universal concept graph; and
generating a candidate set of concept phrases for the content object based on the mapping of the one or more tokens of the set of tokens to the one or more nodes of the first set of nodes.

8. The method of claim 1, wherein the generating of the induced concept graph associated with the content object includes:
accessing a candidate set of concept phrases for the content object;

mapping a pair of concept phrases of the candidate set to a first pair of nodes in the universal concept graph;
identifying a first edge of the first set of edges that connects the first pair of nodes in the universal concept graph;
generating the second set of edges to be included in the induced concept graph, the generating being based on the identified first edge that connects the first pair of nodes in the universal concept graph, the second set of edges including a second edge to connect a second pair of nodes corresponding to the pair of concept phrases of the candidate set.

9. The method of claim 8, further comprising:
based on the candidate set of concept phrases for the content object and the second edge, generating the second set of nodes to be included in the induced concept graph, the second set of nodes including the second pair of nodes to be connected by the second edge in the induced concept graph associated with the content object; and
generating the induced concept graph based on the second set of nodes and the second set of edges, the induced concept graph including the second pair of nodes connected by the second edge.

10. The method of claim 8, further comprising:
identifying an edge weight value associated with the first edge of the first set of edges; and
associating the edge weight value with the second edge to connect the second pair of nodes.

11. A system comprising
one or more hardware processors; and
a non-transitory machine-readable medium for storing instructions that, when executed by one or more hardware processors, cause the system to perform operations comprising:
accessing a universal concept graph that includes a first set of nodes that represent concept phrases derived from one or more internal documents associated with a social networking service (SNS) and one or more external documents that are external to the SNS, and a first set of edges that connect a plurality of nodes of the first set of nodes;
accessing a content object associated with the SNS;
generating an induced concept graph associated with the content object based on analysis of the content object and the universal concept graph, the induced graph including a second set of nodes that represent one or more concept phrases derived from the content object and a second set of edges that connect a plurality of nodes of the second set of nodes;
identifying one or more key concept phrases in the content object based on applying one or more key concept selection algorithms to the induced concept graph, a first key concept selection algorithm of the one or more key concept selection algorithms iteratively removing leaf nodes from the induced concept graph associated with the content object until a desired number of nodes representing key concept phrases are left, a leaf node being connected solely to one other node; and
storing the one or more key concept phrases in a record of a database, the record referencing the content object.

12. The system of claim 11, wherein the identifying of the one or more key concept phrases includes:
selecting the key concept phrases from the one or more concept phrases derived from the content object, the selecting being performed according to a further key concept selection algorithm of the one or more key concept selection algorithms,
wherein the operations further comprise:
generating one or more intermediate rankings of the key concept phrases of the content object according to the further key concept selection algorithm.

13. The system of claim 12, wherein the operations further comprise:
generating a combined ranking of the key concept phrases based on combining the one or more intermediate rankings of the key concept phrases of the content object according to a rank aggregation technique.

14. The system of claim 11, wherein the content object includes a field of a member profile of a member of the SNS, and wherein the one or more key concept phrases are identified in the field of the member profile.

15. The system of claim 14, wherein the field of the member profile is a first field of the member profile, and
wherein the identifying of the one or more key concept phrases in the content object includes identifying a set of key concept phrases in the member profile based on identifying one or more key concept phrases in the first field of the member profile and identifying one or more key concept phrases in a second field of the member profile.

16. The system of claim 11, wherein the generating of the induced concept graph associated with the content object includes:
generating a set of tokens based on the content object;
mapping one or more tokens of the set of tokens to one or more nodes of the first set of nodes included in the universal concept graph; and
generating a candidate set of concept phrases for the content object based on the mapping of the one or more tokens of the set of tokens to the one or more nodes of the first set of nodes.

17. The system of claim 11, wherein the generating of the induced concept graph associated with the content object includes:
accessing a candidate set of concept phrases for the content object;
mapping a pair of concept phrases of the candidate set to a first pair of nodes in the universal concept graph;
identifying a first edge of the first set of edges that connects the first pair of nodes in the universal concept graph;
generating the second set of edges to be included in the induced concept graph, the generating being based on the identified first edge that connects the first pair of nodes in the universal concept graph, the second set of edges including a second edge to connect a second pair of nodes corresponding to the pair of concept phrases of the candidate set.

18. The system of claim 17, wherein the operations further comprise:
based on the candidate set of concept phrases for the content object and the second edge, generating the second set of nodes to be included in the induced concept graph, the second set of nodes including the second pair of nodes to be connected by the second edge in the induced concept graph associated with the content object; and generating the induced concept graph based on the second set of nodes and the second set of edges, the induced concept graph including the second pair of nodes connected by the second edge.

19. The system of claim 17, wherein the operations further comprise:
identifying an edge weight value associated with the first edge of the first set of edges; and
associating the edge weight value with the second edge that connects the second pair of nodes included in the induced concept graph.

20. A non-transitory machine-readable storage medium comprising instructions that, when executed by one or more hardware processors of a machine, cause the machine to perform operations comprising:
accessing a universal concept graph that includes a first set of nodes that represent concept phrases derived from one or more internal documents associated with a social networking service (SNS) and one or more external documents that are external to the SNS, and a first set of edges that connect a plurality of nodes of the first set of nodes;
accessing a content object associated with the SNS;
generating an induced concept graph associated with the content object based on analysis of the content object and the universal concept graph, the induced graph including a second set of nodes that represent one or more concept phrases derived from the content object and a second set of edges that connect a plurality of nodes of the second set of nodes;
identifying one or more key concept phrases in the content object based on applying one or more key concept selection algorithms to the induced concept graph, a first key concept selection algorithm of the one or more key concept selection algorithms iteratively removing leaf nodes from the induced concept graph associated with the content object until a desired number of nodes representing key concept phrases are left, a leaf node being connected solely to one other node; and
storing the one or more key concept phrases in a record of a database, the record referencing the content object.

* * * * *

UNITED STATES PATENT AND TRADEMARK OFFICE
CERTIFICATE OF CORRECTION

PATENT NO. : 10,255,282 B2
APPLICATION NO. : 15/061296
DATED : April 9, 2019
INVENTOR(S) : Kenthapadi et al.

Page 1 of 1

It is certified that error appears in the above-identified patent and that said Letters Patent is hereby corrected as shown below:

In the Claims

In Column 31, Line 30, in Claim 11, after "comprising", insert --:--

Signed and Sealed this
Seventeenth Day of March, 2020

Andrei Iancu
*Director of the United States Patent and Trademark Office*